United States Patent
Weiss et al.

(10) Patent No.: US 8,751,464 B1
(45) Date of Patent: Jun. 10, 2014

(54) INTEGRATED VERSION CONTROL IN A BUSINESS INTELLIGENCE ENVIRONMENT

(75) Inventors: Andrew D. Weiss, Hazlet, NJ (US); Andrew G. Rachmiel, Park Ridge, IL (US)

(73) Assignee: Avnet, Inc., Phoenix, AZ (US)

(*) Notice: Subject to any disclaimer, the term of this patent is extended or adjusted under 35 U.S.C. 154(b) by 755 days.

(21) Appl. No.: 12/369,406

(22) Filed: Feb. 11, 2009

(51) Int. Cl.
*G06F 17/30* (2006.01)

(52) U.S. Cl.
USPC .......................................... 707/695

(58) Field of Classification Search
USPC ............................ 707/695, 999.001–999.005
See application file for complete search history.

(56) References Cited

U.S. PATENT DOCUMENTS

| | | |
|---|---|---|
| 5,008,853 A | 4/1991 | Bly et al. |
| 5,757,372 A | 5/1998 | Krause et al. |
| 5,806,078 A | 9/1998 | Hug et al. |
| 6,067,551 A | 5/2000 | Brown et al. |
| 6,112,024 A | 8/2000 | Almond et al. |
| 6,115,034 A | 9/2000 | Tanaka et al. |
| 6,240,416 B1 | 5/2001 | Immon et al. |
| 6,429,882 B1 | 8/2002 | Abdelnur et al. |
| 6,539,396 B1 | 3/2003 | Bowman-Amuah |
| 6,553,563 B2 | 4/2003 | Ambrose et al. |
| 6,865,583 B2 | 3/2005 | Stockley |
| 7,003,560 B1* | 2/2006 | Mullen et al. ................ 709/223 |
| 7,020,869 B2 | 3/2006 | Abrari et al. |
| 7,386,532 B2 | 6/2008 | Kiessig et al. |
| 7,676,505 B2 | 3/2010 | Chess et al. |
| 7,681,179 B2 | 3/2010 | Travison et al. |
| 2002/0049738 A1* | 4/2002 | Epstein ............................ 707/1 |
| 2002/0069247 A1 | 6/2002 | Paknad et al. |
| 2002/0116399 A1* | 8/2002 | Camps et al. ................ 707/200 |
| 2002/0123984 A1 | 9/2002 | Prakash |
| 2003/0061225 A1* | 3/2003 | Bowman et al. ............ 707/100 |
| 2003/0158919 A1* | 8/2003 | Fomenko ....................... 709/220 |
| 2003/0204835 A1* | 10/2003 | Budhiraja et al. ........... 717/120 |

(Continued)

FOREIGN PATENT DOCUMENTS

| | | |
|---|---|---|
| EP | 1 380 939 | 1/2004 |
| EP | 1 798 639 | 6/2007 |

(Continued)

OTHER PUBLICATIONS

BrightStar Partners, Inc., "Installation and User Guide," MyPages Copy Utility Version 1.0, 15 pages (2005).

(Continued)

*Primary Examiner* — Bai D. Vu
(74) *Attorney, Agent, or Firm* — Lempia Summerfield Katz LLC

(57) ABSTRACT

A version control system integrated within a business intelligence environment includes a version control server configured for network communication with a business intelligence server and a client of a business intelligence network, and a version control repository in communication with the version control server and configured for storage of multiple versions of a definition of an object of the business intelligence environment developed via a browser interface of the client. The browser interface is created in accordance with a first textual instruction set and configured with a save operation to store a current version of the object definition in the metadata repository. The browser interface is configured by the version control server with a second textual instruction set called by the first textual instruction set such that implementation of the save operation stores the current version of the object definition in the version control repository.

34 Claims, 31 Drawing Sheets

(56) References Cited

U.S. PATENT DOCUMENTS

| | | | |
|---|---|---|---|
| 2005/0027757 A1* | 2/2005 | Kiessig et al. | 707/204 |
| 2005/0075964 A1 | 4/2005 | Quinn et al. | |
| 2005/0108186 A1* | 5/2005 | Anderson | 707/1 |
| 2005/0234969 A1 | 10/2005 | Mamou et al. | |
| 2006/0041558 A1* | 2/2006 | McCauley et al. | 707/10 |
| 2006/0085406 A1* | 4/2006 | Evans et al. | 707/3 |
| 2006/0225028 A1* | 10/2006 | Lau et al. | 717/102 |
| 2007/0044023 A1 | 2/2007 | Carter et al. | |
| 2007/0174069 A1* | 7/2007 | Moore et al. | 705/1 |
| 2007/0213598 A1 | 9/2007 | Howard et al. | |
| 2007/0288891 A1 | 12/2007 | Aakolk et al. | |
| 2008/0046433 A1 | 2/2008 | Kool-Brown et al. | |
| 2008/0115064 A1 | 5/2008 | Roach et al. | |
| 2008/0163253 A1 | 7/2008 | Massmann et al. | |
| 2008/0178117 A1 | 7/2008 | Gelman et al. | |
| 2008/0189682 A1 | 8/2008 | Rude | |
| 2008/0215588 A1 | 9/2008 | Mattheisen | |
| 2008/0250329 A1 | 10/2008 | Stefik et al. | |
| 2009/0019351 A1 | 1/2009 | Hitchcock et al. | |
| 2009/0024674 A1 | 1/2009 | Gallagher | |
| 2009/0125131 A1 | 5/2009 | Eldridge et al. | |
| 2009/0125834 A1 | 5/2009 | Morris et al. | |
| 2009/0235179 A1 | 9/2009 | Singh et al. | |
| 2009/0249368 A1 | 10/2009 | Needamangala et al. | |
| 2009/0319930 A1 | 12/2009 | Groh et al. | |

FOREIGN PATENT DOCUMENTS

| | | |
|---|---|---|
| EP | 1 850 244 | 10/2007 |
| GB | 2 421 606 | 6/2006 |
| JP | 2003/044429 | 2/2003 |
| JP | 2006/277435 | 10/2006 |
| WO | WO 02/084481 | 10/2002 |
| WO | WO 2004/109443 | 12/2004 |

OTHER PUBLICATIONS

Product information sheet, "Product Overview—MotioCI, Continuous Integration," Motio, Inc., 1 page (2008).

Product information sheet, "MotioCI—Continuous Integration for Business Intelligence," www.focus-technologies.com, Motio, Inc., 1 page (Jan. 2009).

Lindsay et al., "A Generic Model for Fine Grained Configuration Management Including Version Control and Traceability," IEEE Proceedings of the Australian Software Engineering Conference, pp. 27-36 (Apr. 1997).

Fang et al., "A Version-aware Approach for Web Service Client Application," IEEE Int'l Conference on Web Services (ICWS 2007), pp. 401-409 (Jul. 2007).

Mühlbacher et al., "Towards a Framework for Collaborative Software Development of Business Application Systems," IEEE Proceedings of WET ICE 96, pp. 334-339 (1996).

Sachweh et al., "Version Management for Tightly Integrated Software Engineering Environments," IEEE Proceedings of the 1995 Software Engineering Environment Conferences, pp. 21-31 (Feb. 1995).

Citro et al., "Conflict Management for Real-Time Collaborative Editing in Mobile Replicated Architectures," 13$^{th}$ Austra/asian Comp. Sci. Conf. (ACSC 2007), vol. 62, pp. 115-124 (2007).

Alan Heirich, "UIG: The User Interface Generator," ACM Proceedings of the 15$^{th}$ Annual Conf. on Comp. Sci., pp. 67-73 (1987).

Van den Bergh et al., "Towards Modeling Context-Sensitive Interactive Applications: the Context-Sensitive User Interface Profile (CUP)," Proceedings of the 2005 Symposium on Software Visualization, pp. 87-94 (2005).

Puntikov et al. "AVCS: The APL Version Control System," ACM Proceedings of the Int'l Conf. on APL, pp. 154-161 (1995).

"Version management for multi-part documents using IBM Content Manager," IP.com Prior Art Database, No. IPCOM000143240D, 3 pages (Nov. 2006).

Cederqvist et al., "Version Management with CVS," Free Software Foundation, Inc., 222 pages (2006).

"File Menu: Disable Save As Web Page Complete," http://technet.microsoft.com/en-us/library/cc960629.aspx, 1 page (May 2009).

Coleco Junior et al., "Mining Software Change History in an Industrial Environment," IEEE Proceedings of the 2009 XXIII Brazilian Symposium on Software Engineering, pp. 54-61 (Oct. 2009).

"Sapiens International Introduces ObjectPool, Object-Based Enterprise Application Development Toolset; Customer-Proven Solution Rapidly Delivers Applications to the Enterprise," Business Wire, 13 pages (Jul. 1996).

Grace et al., "Presentation Gains Weight," InfoWorld, vol. 18, No. 11, pp. 68-70 (Mar. 1996).

"Microsoft to Preview Dynamic HTML Editing Component for Broad Application Use," PR Newswire, 3 pages (Mar. 1998).

Cognos® 8 Business Intelligence, "Architecture and Planning Guide," 100 pages (2006).

Citro et al., "Conflict Management for Real-Time Collaborative Editing in Mobile Replicated Architectures," 13$^{th}$ Australasian Comp. Sci. Conf. (ACSC 2007), vol. 62, pp. 115-124 (2007).

"Overriding JavaScript Functions,", Daniel Larson's Developer Blog, http://daniellarson.wordpress.com/2006/05/02/overriding-javascript-functions/, 4 pages, May 2, 2006.

"How to do a Non-Destructive Overwrite of a Function in JavaScript," JavaScript Kata, http://www.javascriptkata.com/2005/05/03/how-to-do-a-non-destructive-overwrite-of-a-function-in-javascript/, 6 pages, May 3, 2007.

"JavaScript: Changing a Button's onClick Programmatically Client-Side," TGAW, http://tgaw.wordpress.com/2006/06/02/javascript-changing-a-buttons-onclick-programmatically-client-side/, 5 pages, Jun. 2, 2006.

Non-final action dated Apr. 28, 2011, in related U.S. Appl. No. 12/578,669, 13 pages.

Non-final action dated Dec. 15, 2010, in related U.S. Appl. No. 12/841,975, 25 pages.

Non-final action dated Oct. 28, 2011, in related U.S. Appl. No. 12/578,669, 22 pages.

* cited by examiner

BSP Software – Integrated Version Control

BSP Software – Integrated Version Control

The Integrated Version Control Service contains the following stored report versions.

Previous Versions

| | Date | Notes | Account | Actions | |
|---|---|---|---|---|---|
| ✓ | 1/22/2009 8:55:09 AM | Added a title | Andrew Rachmiel | ☐ ☐ ☐ | More... |
| ☐ | 1/22/2009 8:50:09 AM | Fixed broken query | Andrew Weiss | ☐ ☐ ☐ | More... |
| ☐ | 1/22/2009 8:43:31 AM | Initial Report | Neil Morgan | ☐ ☐ ☐ | More... |

Available Actions:
Compare specifications of selected versions
Compare outputs of selected versions
Show all versions

[ Save ]  [ Close ]

*FIG. 9A*

BSP Software – Integrated Version Control

BSP Software – Integrated Version Control

The Integrated Version Control Service contains the following stored report versions.

Previous Versions

| | Date | Notes | Account | Actions | |
|---|---|---|---|---|---|
| ✓ | 1/22/2009 8:55:09 AM | Added a title | Andrew Rachmiel | ☐☐☐☐ | More... |
| ☐ | 1/22/2009 8:54:02 AM | | Andrew Rachmiel | ☐☐☐☐ | More... |
| ☐ | 1/22/2009 8:52:33 AM | Fixed broken query | Andrew Rachmiel | ☐☐☐☐ | More... |
| ☐ | 1/22/2009 8:50:09 AM | | Andrew Weiss | ☐☐☐☐ | More... |
| ☐ | 1/22/2009 8:48:42 AM | | Andrew Weiss | ☐☐☐☐ | More... |
| ☐ | 1/22/2009 8:47:22 AM | Initial Report | Neil Morgan | ☐☐☐☐ | More... |
| ☐ | 1/22/2009 8:43:41 AM | | Neil Morgan | ☐☐☐☐ | More... |
| ☐ | 1/22/2009 8:40:00 AM | | | | |

Available Actions:

Compare specifications of selected versions
Compare outputs of selected versions

[ Save ]   [ Close ]

*FIG. 9B*

BSP Software – Integrated Version Control

BSP Software – Integrated Version Control

Differential report for Sample Report
Left: Historical Version
Right: Current Version

| | | |
|---|---|---|
| 1 | 1 | `<report xmlns="http://developer.cognos.com/schemas/report/4.0/" expressionLoc` |
| 2 | 2 | `<modelPath>/content/package[@name='GO Sales and Retailers']/` |
| 3 | 3 | `<queries>` |
| 4 | 4 | `<query name="Query1">` |
| 5 | 5 | `<source>` |
| 6 | 6 | `<model/>` |
| 7 | 7 | `</source>` |
| 8 | 8 | `<selection>` |
| 9 | 9 | `<dataItem name="Order number" aggregate="none"` |
| | 10 | `<expression>[gosales_goretailers].[Orders].[Order number]</expressi` |
| 10 | 11 | `<expression>[gosales_goretailers].[Orders].[Order Name]</expressi` |
| 11 | 12 | `</dataItem>` |
| 12 | 13 | `</selection>` |
| 13 | 14 | `</query>` |
| 14 | 15 | `</queries>` |
| 15 | 16 | `<layouts>` |
| 16 | | `<layout>` |

<!-- BEGIN: BSP Software IVC Service Modification -->

<!--<toolbarButton id="btnFileSave" idsTooltip="IDS_MI_FILE_SAVE" smallIcon="hal/images/btn_save.gif" enabled="false"
onCommand="_8K8._RD7();"/>-->

<toolbarButton id="btnFileSave" idsTooltip="IDS_MI_FILE_SAVE" smallIcon="hal/images/btn_save.gif" enabled="false" onCommand="_8K8._RD7();
window.open('../ivc/SubmitVersion.htm','_blank','top=100,left=100,height=400,width=480');"/>
<toolbarButton id="btnFileRevisions" idsTooltip="IDS_MI_FILE_REVISIONS" smallIcon="../ivc/images/revisions.gif" enabled="true"
onCommand="window.open('../ivc/DisplayVersion.htm','_blank','scrollbars=yes,resizable=yes,top=100,left=100,height=500,width=750');"/>

<!-- END: BSP Software IVC Service Modification -->

```
SubmitVersion.htm - Notepad

File   Edit   Format   View   Help

<html>
<head>
<meta http-equiv="Content-Type" content="text/html; charset=UTF-8">
<title>BSP Software - Integrated Version Control</title>
<link rel="stylesheet" type="text/css" href="../skins/corporate/portal/default.css">
<link rel="stylesheet" type="text/css" href="../skins/corporate/fonts.css">

<script src="scripts/app_common.js"></script>
<script src="scripts/app_SubmitVersion.js"></script>
<script src="scripts/prototype-1.6.0.3.js"></script>
<script src="scripts/QueryString.js"></script>
<script src="scripts/XMLWriter.js"></script>

</head>
<body onload="OnLoad();" topmargin="3" bottommargin="0" marginheight="3"
rightmargin="3" leftmargin="3" marginwidth="3" style="overflow: auto" class="dialogBody">
<div id="Div1" style="overflow: auto; width=100%; height=100%>
<table border="0" width="100%" cellspacing="0" cellpadding="0" class="dialogHeader">
<tr>
    <td valign="top" class="dialogHeaderTitle" width="100%" nowrap>
    <span>BSP Software - Integrated Version Control</span></td>
    <td valign="middle" nowrap class="dialogHeaderLink">
    <a href="javascript:void" class="dialogHeaderLinkColor" onmouseover="window.status='';return true;" onmouseout="window.status='';return true;">Help</a></td>
    <td align="right" valign="middle" style="padding-right: 3px;">
    <a href="javascript:DoClose();" onmouseover="window.status='';return true;" onmouseout="window.status='';return true;" class="dialogClose" vspace="2" border="0" src="../skins/corporate/port
        alt="Close" onmouseover="this.className = 'dialogCloseOver'" onmouseout="this.className = 'dia
        <img height="16" width="16" class="dialogClose"
        title="Close"></a></td>
</tr>
</table>
```

*FIG. 16*

```
86  - //-->]]></script></td>
87  - <td style="background-color:white;white-space:nowrap;border:1px solid
88    <script>//<![CDATA[<!--
89    VA3._PU5( 10 );function _NI4(_NH6,_EJ6,_WB1){this._OH6=_NH6;this._X
90    F26._TG5=function(){return this._TP6;};_F26._608=function(){return th
91    _6K8._8H6();
92  - //-->]]></script>

93    <!-- BEGIN: BSP Software IVC Service Modification -->
94    <div id="divIVC"></div>
95    <script src="./ivc/scripts/app_Common.js"></script>
96    <!-- END: BSP Software IVC Service Modification -->

97  - </body>
98  - </html>
```

FIG. 19A

```
165  style="display:none"><input type="hidden" name="b_action" value=
166  "showError" id="Hidden11"> <input type="hidden" name="soapFault"
167  Id="Hidden12"> <input type="hidden" name="errURL" value=
168  "javascript:window.close()" id="Hidden13"></form>
169  <div id="ImageMap" style="display:none"><map name=
170  "ChartMap"></map></div>
171      <!-- BEGIN: BSP Software IVC Service Modification -->
172      <div id="divIVC"></div>
173      <script src="../ivc/scripts/app_Common.js"></script>
174      <!-- END: BSP Software IVC Service Modification -->
175  </body>
176  </html>
```

*FIG. 19B*

```
 5   <ui>
 6   <toolbarContent category="standard" xmlns:xts="http://deve
 7     <spacer/>
 8     <button id="NewReport"/>
 9     <button id="OpenReport"/>
10     <button id="Save"/>
11     <button id="SaveAs"/>
12     <!-- BEGIN: BSP Software IVC Service Modification -->
13     <button id="IVC_Commit"/>
14     <button id="IVC_Revisions"/>
15     <!-- END: BSP Software IVC Service Modification -->
16     <separator/>
17     <button id="Cut"/>
```

*FIG. 20A*

```
                                </icon>
                            </menuItem>
                        </feature>
                        <feature name="Upgrade"></feature>
                        <feature name="DownloadChart"></feature>
                        <!-- BEGIN: BSP Software IVC Service Modification -->
                        <feature name="IVC_Commit">
                            <menuItem type="menuItem">
                                <label>Save with comments</label>
                                <tooltip>Save with comments</tooltip>
                                <action>[...]
                                <icon>[...]
                            </menuItem>
                            <toolbar buttonType="button">
                                <tooltip>Save with comments</tooltip>
                                <icon>[...]
                                <action>[...]
                            </toolbar>
                        </feature>
                        <feature name="IVC_Revisions">[...]
                        <!-- END: BSP Software IVC Service Modification -->
                    </included>
                    <excluded>
                    </excluded>
                </features>
```

INTEGRATED VERSION CONTROL IN A BUSINESS INTELLIGENCE ENVIRONMENT

BACKGROUND OF THE DISCLOSURE

1. Field of the Disclosure

The disclosure relates generally to business intelligence systems and, more particularly, to business intelligence systems with browser interfaces.

2. Brief Description of Related Technology

Business intelligence software has supported a wide variety of business functions. Software solutions are commonly applied in performance analysis, ad hoc reporting, and competitive analysis, to name but a few of the functions supported. As a result, a broad array of business areas routinely rely on business intelligence software, including manufacturing, distribution, purchasing, accounting, personnel management, product planning, inventory maintenance, sales, and customer service. The often vast amounts and types of enterprise data generated by these frequently disparate business areas are usually stored in one or more database management systems (DBMS) accessible to the business intelligence solution.

Business intelligence software applications also typically rely on data schemes involving metadata (in one aspect, data about data) to describe the wide-ranging nature and relationships of the enterprise data stored in the DBMS. For example, the metadata for a business application can be used to specify the definitions, sources and relationships of enterprise data. Another layer of metadata may then specify the manner in which customized arrangements of information detailing, for instance, customer sales orders or inventory status, are generated from the tables, attributes, and other data constructs supported by the databases.

Data schemes and other metadata become especially useful as a database is accessed by areas of the enterprise other than the area directly responsible for populating the database. Business intelligence software applications have been developed to address the challenges and complexity in sharing and utilizing information among different information systems and databases, as well as a wide range of users. For instance, some solutions can compile and manage the information from the various data sources within and outside of the organization. These solutions include SAP BusinessObjects, Microsoft Business Intelligence, Oracle Business Intelligence, and IBM Cognos. These products can be used to establish a networked environment in which user interfaces are rendered at a client within a browser.

The user interfaces of IBM Cognos and other business intelligence software applications provide browser-based development interfaces (commonly referred to as studios) to support the development and presentation of the interfaces of the end user environment. The end user interfaces may be structured in the form of reports, analytical views, scorecards, dashboards, event sequences, etc. These objects of the environment are authored within the studios utilizing a metadata model characterizing the various data sources, data types, data relationships, data filters, naming conventions, etc. A definition of each object of the environment stores the metadata defining the elements of the object, such as an aesthetic feature or a data construct that populates the report layout and data at runtime. The object definition is stored in a shared repository (commonly referenced in IBM Cognos as the Content Store) by the author through execution of a "save" operation made available via each studio interface.

The object authoring process is often iterative. In many cases, an author of an object definition proposes a first version to consumers or end users to obtain comments and feedback. The comments can include suggestions for changes that are then incorporated into a subsequent version of the object definition. A variety of other circumstances can lead to modifications, including underlying changes to the metadata model, peer review, institutional checkpoints in the development process, and debugging efforts. Still further modifications can occur throughout the lifecycle of an object after the object has been released for use.

Some iterations and modifications can involve reverting back to a previous version of the object. Reversion can be useful, as changes to an object definition can introduce errors or undesired results. An effort to address those errors or results can benefit from a recovery or review of a previous version of the object definition.

Because an object definition is typically saved as a distinct item or object in a database table, authors can preserve previous versions by modifying the reference name for the object definition. For instance, varying the name with an extension (e.g., v1, v2, etc.) prevents the save operation from overwriting the object definition saved for the previous version. This informal, manual approach is prone to error and inconsistency, as the author may fail to remember to rename the object before initiating each successive save operation.

Commercially available software has attempted to preserve previous versions of IBM Cognos object definitions by automatically inspecting the IBM Cognos system on a periodic basis to determine if any object definitions have changed since the previous inspection. If a definition has changed, the object definition is captured and stored as a new version of the object. Further details regarding the software may be found in U.S. Patent Publication No. 2007/0174069.

However, periodic inspections may fail to capture intermediate revisions. A potential disconnect between the version history and the actual history of updates arises when more than one save operation occurs between successive inspections. Unfortunately, simply increasing the rate at which inspections occur may not eliminate the problem, as scanning all object definitions within the IBM Cognos system may, for example, require an undesirably long period of time.

SUMMARY OF THE DISCLOSURE

In accordance with one aspect of the disclosure, a version control system is useful for a business intelligence network having a business intelligence server and a metadata repository in communication with the business intelligence server for storage of metadata indicative of a definition of an object of a business intelligence environment developed via a browser of a client directed by the business intelligence server. The version control system includes a version control server configured for network communication with the business intelligence server and the client, and a version control repository in communication with the version control server and configured for storage of multiple versions of the object definition. The business intelligence server is configured with a first textual instruction set to direct the browser to create an interface of the business intelligence environment. The interface includes a save operation to store a current version of the object definition in the metadata repository. The browser is further directed by the version control server with a second textual instruction set called by the first textual instruction set and configured such that implementation of the save operation sends the current version of the object definition to the version control server to store the current version of the object definition in the version control repository as one of the multiple versions of the object definition.

In some cases, the second textual instruction set is configured to direct the browser to incorporate a version history viewing operation into the interface. Alternatively or additionally, the second textual instruction set is further configured to direct the browser to incorporate a version comparison operation into the interface. Alternatively or additionally, the second textual instruction set is further configured to direct the browser to incorporate a save-with-comments operation into the interface. Alternatively or additionally, the second textual instruction set is further configured to direct the browser to incorporate a reversion operation into the interface to replace the current version of the object definition in the metadata repository with a selected one of the multiple versions of the object definition.

The object definition may define several different types of objects of the business intelligence environment, including, for example, a report, a job, or an event sequence.

The first textual instruction set may include one or both of markup language instructions or scripting language instructions. The second textual instruction set may also include one or both of markup language instructions or scripting language instructions.

In one embodiment, the first textual instruction set includes a definition of the save operation and a function call to the second textual instruction set that follows the definition of the save operation such that loading the second textual instruction set renames and replaces the definition of the save operation at run-time before the browser is directed to create the interface.

In accordance with another aspect of the disclosure, a method provides version control in a business intelligence network having a business intelligence server and a metadata repository in communication with the business intelligence server and configured for storage of a current version of a definition of an object of a business intelligence environment developed via a browser of a client directed by the business intelligence server. The method includes the steps of directing the browser to create an interface of the business intelligence environment in accordance with a first textual instruction set on the business intelligence server, the interface including a save operation to store the current version of the object definition in the metadata repository, and sending the current version of the object definition to a version control server in response to an invocation of the save operation and in accordance with a second textual instruction set called by the first textual instruction set and directed to storage of the current version of the report definition in a version control repository.

In some cases, the method further includes the step of directing the browser to incorporate a version history viewing operation into the interface in accordance with the second textual instruction set. Alternatively or additionally, the method further includes the step of directing the browser to incorporate a version comparison operation into the interface in accordance with the second textual instruction set. Alternatively or additionally, the method further includes the step of directing the browser to incorporate a save-with-comments operation into the interface in accordance with the second textual instruction set. Alternatively or additionally, the method further includes the step of directing the browser to incorporate a reversion operation into the interface in accordance with the second textual instruction set to replace the current version of the object definition in the metadata repository with a selected one of the multiple versions of the object definition. In one embodiment, the directing step includes the steps of loading a definition of the save operation in accordance with the first textual instruction set, and implementing a function call to the second textual instruction set after the loading step such that the definition is renamed and replaced at run-time.

In accordance with yet another aspect of the disclosure, a method is useful for configuring a business intelligence network having a business intelligence server and a metadata repository in communication with the business intelligence server configured for storage of a current version of a definition of an object of a business intelligence environment developed via a browser of a client directed by the business intelligence server. The method includes the step of modifying a first textual instruction set on the business intelligence server for directing the browser to create an interface of the business intelligence environment, the interface including a save operation to store the current version of the object definition in the metadata repository. The modifying step, in turn, includes the step of incorporating a version control function call into the first textual instruction set such that user initiation of the save operation causes the version control function call to be implemented. The method further includes the step of installing a second textual instruction set on a version control server in communication with the business intelligence network, the second textual instruction set being referenced in the version control function call and configured to direct the current version of the object definition to a version control repository configured to store multiple versions of the object definition.

BRIEF DESCRIPTION OF THE DRAWING FIGURES

For a more complete understanding of the disclosure, reference should be made to the following detailed description and accompanying drawing figures, in which like reference numerals identify like elements in the figures, and in which:

FIGS. 9A and 9B are simplified representations of exemplary browser interfaces (i) generated by the software module arrangement and client-server framework depicted in FIG. 4, and (ii) configured to present version history information and support version control operations for managing the version history;

FIG. 12 is a simplified representation of an exemplary browser interface (i) generated by the software module arrangement and client-server framework depicted in FIG. 4, and (ii) configured to present an object definition comparison of two versions selected via the interface of FIG. 9;

FIG. 15 is an excerpt of an exemplary textual, markup language instruction set of a business intelligence server to direct a client browser to create or display a development interface, the instruction set having one or more modifications to integrate version control functionality in accordance with one aspect of the disclosure;

FIG. 16 is an excerpt of an exemplary markup language instruction set of a version control server referenced or called in the instruction set excerpt of FIG. 15 and configured to direct a client browser to implement one or more version control features, functions or operations in connection with an object definition save operation;

FIGS. 19A and 19B are excerpts of exemplary textual, markup language instruction sets of a business intelligence server to direct a client browser to create or display a development interface, the instruction sets having one or more modifications to integrate version control functionality in accordance with the embodiment of FIGS. 18A and 18B;

Figure 17:
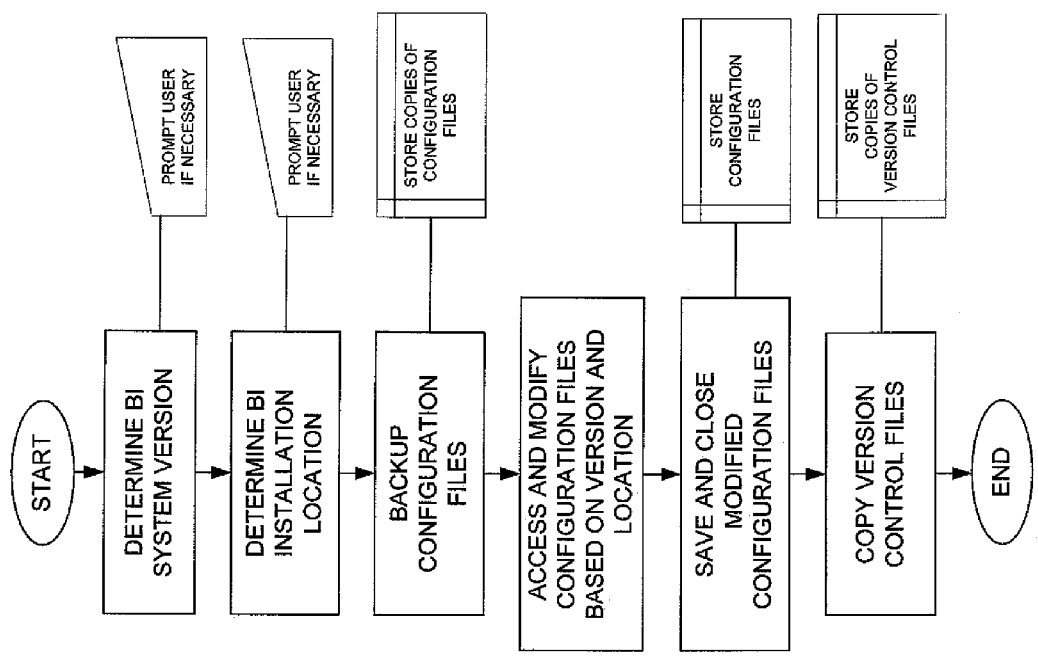
FIG. 17 is a flow diagram of an exemplary process for modifying an existing installation of a business intelligence application to incorporate or integrate version control features via modification and installation of textual instruction sets in accordance with one or more aspects of the disclosure.

FIGS. 20A and 20B are excerpts of further exemplary textual, markup language instruction sets of a business intelligence server to direct a client browser to create or display a development interface, the instruction sets having one or more modifications to integrate version control functionality in accordance with alternative embodiments; and, FIGS. 21A-21E are simplified representations of exemplary configuration interface displays to support an automated modification of the existing installation of the business intelligence service in accordance with the process depicted in FIG. 17.

While the disclosed systems, methods, and computer-executable procedures are susceptible of embodiments in various forms, there are illustrated in the drawing (and will hereafter be described) specific embodiments of the invention, with the understanding that the disclosure is intended to be illustrative, and is not intended to limit the invention to the specific embodiments described and illustrated herein.

DETAILED DESCRIPTION OF THE DISCLOSURE

The disclosure generally relates to version control systems and methods integrated with a business intelligence service to provide version control operations in real-time and seamlessly within browser interfaces of the business intelligence service.

Several aspects of the disclosed systems and methods relate to incorporating version control functionality into an existing installation of a business intelligence service. In one aspect, the disclosed systems and methods generally utilize the textual nature of instructions sets defining browser interfaces of a client-server framework of the existing installation. As described below, the browser-based approach to supporting the client-server framework may be modified to incorporate aspects of the disclosed version control operations via modifications to the textual instruction sets of the existing installation.

The integration of the version control operations within the business intelligence application or service provides several advantages and results. As described below, the disclosed version control systems and methods provide an automated way to capture each version of an object definition of the business intelligence environment in real-time. As the disclosed version control systemsand methods are integrated into the business intelligence system, the object definitions are captured regardless of any security or access restrictions. As described below, whenever an object or other artifact of the business intelligence environment is modified and saved, metadata indicative of each version is retained in a data repository of the disclosed version control systems. In some cases, a user is provided with an opportunity to store comments with the version metadata to, for instance, help track the nature of the modification(s) preceding the save operation. In other cases, at the user's discretion, the version can be captured in a manner transparent to the user, e.g., without user comments or user interaction. In either case, comments can be added, modified, or deleted at a later point in time through user interface displays of the disclosed version control systems.

The integration also allows the disclosed systems and methods to present and manage previous versions in an easily accessible manner directly through the interface(s) or interface display(s) of the business intelligence environment while preserving the underlying integrity and security of the business intelligence environment itself. As described below, only users with the proper security credentials to view or modify the current object definition stored in the business intelligence environment will be provided with access through the user interface displays of the disclosed version control systems to see previous versions of the object definition. Thus, one aspect of the disclosed version control systems and methods involves the preservation of security measures in place to protect the object definitions. To that end, it is advantageous that the previous versions (and the version control system itself) are accessed through the business intelligence system. As a result, the user security in place within the business intelligence system that determines access restrictions or levels is also determinative of the access to previous versions of the object definitions stored in the version control data system. Only users with access to the current version of the object definition stored in a repository of the business intelligence system have access to the previous versions of the object definitions stored in a repository of the version control system. In this manner, the disclosed version control systems and methods operate inside the scope of the existing business intelligence system's security infrastructure and need not provide or support a separate security infrastructure.

Another aspect of the disclosed version control systems and methods involves the transparent manner in which previous versions are stored, accessed, and otherwise made available within the business intelligence environment. Generally speaking, previous versions can be accessed through the business intelligence system even when the repository in which the previous versions are stored may be external to the business intelligence system. The disclosed systems and methods may be configured such that end users have no knowledge that the previous versions are stored outside the business intelligence system. In these ways, and as described below, previewing the previous versions, running them, comparing them to the current or any other previous version visually or programmatically, or reincorporating them back into the business intelligence system, constitute operations implemented through modified browser interfaces of the business intelligence environment in a seamless manner despite the separate or external nature of the version control system.

Several aspects of the disclosed version control systems and methods address a number of problems presented by non-integrated approaches to version control. Every save operation of an object definition is captured as it occurs because the disclosed systems and methods have direct access to, and directly integrated within, the development workflow of the business intelligence environment. In contrast, external approaches to version control are unable to know when a save operation occurs until the business intelligence system is inspected after the revision. External approaches are also unable to ask for user-defined or user-supplied comments to be associated with the saved version in real time because they can only know of a new version after the save operation occurred. In addition, the integrated nature of the disclosed systems and methods allow version control steps to be transparent to the users, instead of, for instance, requiring a separate and distinct software application to access previous versions. By integrating into the live workflow of the business intelligence environment, the disclosed systems are not prone to missing previous versions of an object definition, which could otherwise occur in the event of unexpected downtime or when the object definition is modified and saved in a frequent manner (e.g., every few seconds).

The disclosed techniques are described below in connection with several examples involving the IBM Cognos business intelligence applications available from IBM. Although well-suited for implementation with those applications, practice of the disclosed techniques is not limited to any one business intelligence architecture, application service, or software module. Accordingly, references to items or aspects that may be considered specific to an IBM Cognos business intelligence system or context should instead be read broadly to include any one of the commercially available, open source, or other business intelligence applications, architectures or environments.

Practice of the disclosed systems and methods is also not limited to any particular type of business intelligence data repository type, device, data storage scheme, or operating system. Despite the description herein of data repositories in connection with an object-oriented database scheme, the disclosed systems and methods may instead utilize one or more databases, file systems, etc., having a variety of different data storage structures, schemes, protocols, standards, or architectures. For instance, the structure(s) may include one or more data containers, with each container having one or more records, the data within each record being organized into one or more fields. The structures may alternatively or additionally be arranged in a relational database scheme. As a result, terms such as "object" should be read broadly and not limited to object-oriented database schemes, but rather to accordingly include corresponding elements or items of other database schemes.

Figure 1:
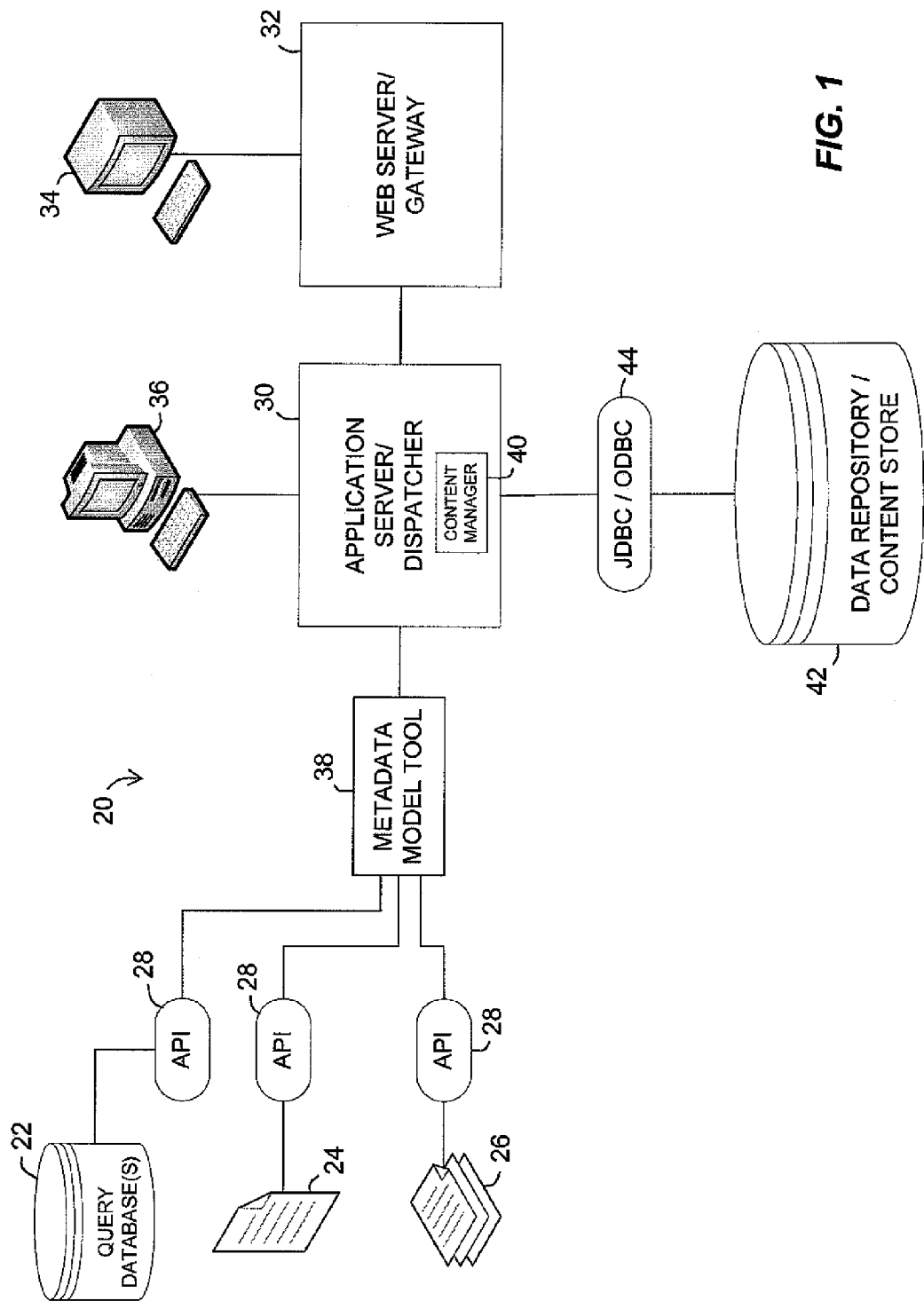
FIG. 1 is a schematic representation of one example of a business intelligence architecture compatible with a version control system or service configured in accordance with one or more aspects of the disclosure.

With reference now to the drawing figures, FIG. 1 depicts a schematic representation of a client-, web-, or network-based business intelligence architecture suitable for use with the disclosed version control systems and methods. The architecture includes a networked system infrastructure indicated generally at 20 for supporting communications with any number of information systems to be integrated and assimilated within the architecture. In this example, any number of databases 22, any number of flat files 24 (e.g., an XML document or spreadsheet), and any number of data file sets 26 constitute the information systems that act as sources of enterprise data. The databases 22 may include or involve any commercially available or open-source database or database management system (DBMS), including those that are compliant with the ODBC (Open Database Connectivity) standard, the JDBC (Java Database Connectivity) standard, or other standards or protocols. One or more of the databases 22 (or DBMS) may form part of a business software system or enterprise resource and planning (ERP) system, such as Microsoft Dynamics, SAP, Oracle ERP, or Intuit QuickBooks. The data sources may be accessed or controlled via respective application program interfaces (APIs) 28, but practice of the disclosed techniques is not limited to architectures or information source communications involving APIs.

The information provided by the data sources 22, 24, 26 is integrated by one or more business intelligence application services implemented on or via one or more application server devices 30. In some cases, the application services may be implemented to any desired extent by any one or more of the other devices shown in FIG. 1. Generally speaking, the business intelligence application services may be implemented via a variety of server configurations, including web servers, data servers, and the client- or web-based user interfaces generated thereby. The applications may, but need not, correspond with the software modules made available with IBM Cognos. As described below, the disclosed systems and methods are integrated with one or more of these applications and modules to provide real-time version control features and operations from within the business intelligence environment created by the applications and modules. While certain aspects or devices of the disclosed systems and methods may be distinct or separate from the components of the business intelligence infrastructure 20, the separate nature of these aspects or devices is transparent to end users of the environment as described below. In several ways also described below, the integration of the disclosed systems and methods within the business intelligence architecture generally helps maintain the integrity of the business intelligence environment through intrinsic use of the security and other features of the application services.

In this example, the business intelligence application software modules are run on the server device 30 (or other networked device) to support networked implementation of the business intelligence environment. In other cases, the server device 30 may be one of any number of service units or devices running the software modules. In any case, the business intelligence application(s) support the creation, generation and management of reports, analytical views, scorecards, dashboards, sequencing of events, and other presentations of the enterprise data. The presentations are generally defined to integrate and assimilate the enterprise data made available by the data sources 22, 24, 26. To these ends, the application(s) may handle a variety of different requests (or queries) for data or information from the data sources 22, 24, 26. In IBM Cognos examples, the application server 30 includes a dispatcher service to route such requests and distribute information and data to other components or nodes within the infrastructure 20 or external thereto. The dispatcher may include a Java servlet, further details of which are well known to those skilled in the art.

TCP/IP and other network communications within the infrastructure 20 may be processed through one or more web or network servers or gateways 32. Each gateway 32 generally acts as an extension of a web or network server program or module that, for instance, is directed to transfers of information to and from one or more of the application servers 30. Any one of a number of different gateways 32 is suitable for use in connection with the business intelligence application services and the disclosed systems and methods, including for instance CGI, ISAPI, Apache_Mod and Servlet. Alternatively or additionally, network or web communications occur directly with a dispatcher on the application server 30, which may be useful when, for instance, a firewall is in place within the infrastructure 20. More generally, the application server 30 and the gateway 32 may be integrated to any desired extent over any number of server computers or other service units to support the networked communications underlying the deployment of the business intelligence environment and the integrated implementation of the systems and devices of this disclosure.

Any number of client devices or other interface units may be in communication with the application server(s) 30 either directly or through the web server gateway 32. As schematically shown in FIG. 1, a client terminal device 34 may send and receive communications through the gateway 32, and a client workstation (e.g., a Microsoft Windows client) 36 may communicate with the application server 30 via a local area network (LAN) or any other desired network connection or communication technique. The client terminal device 34, the client workstation 36, and any other unit within the network infrastructure 20 generally utilize a browser-based interface to implement or access the business intelligence environment. As described further below, the network browser approach generates the user interfaces utilized to author, maintain, or view the reports and other objects of the environment. In IBM Cognos examples, the application server(s) 30 are configured to implement a number of software modules directed to generating user interface sets arranged in studios, including, for instance, Report Studio (advanced authoring), Query Studio (basic authoring), Analysis Studio, and Event Studio. These studios and other user interfaces of the business intelligence environment, including IBM Cognos Connection, a network portal for accessing the studios, are described further below with the understanding that they are examples of the programs implemented via the client-server framework terminating in the client devices 34, 36, and practice of the disclosed version control systems and methods is not limited thereto. The structure of the client-server framework may also vary from the examples shown and described herein.

The client-server framework and approach to implementing the business intelligence environment may utilize managed code applications and server-based applications through the network services functionality of, for instance, Java, or Microsoft .NET. However, the business intelligence infrastructure 20, as well as the disclosed systems and methods, are compatible with a variety of server, network, web, and operating system environments, including all of the environments utilized in connection with the aforementioned IBM Cognos software. Compatible operating systems include, for instance, Microsoft Windows, UNIX and Linux. Examples of suitable server communication techniques and services are provided below in connection with an exemplary business intelligence network in which the disclosed version control systems and methods are integrated.

The application server 30 may implement a number of software modules generally responsible for supporting the creation of the business intelligence report and other object definitions of the user environment. For example, one or more program modules 38 may be directed to modeling the metadata that links the business intelligence applications to the data sources 22, 24, 26. The model may identify the specific locations within the data sources 22, 24, 26, as well as otherwise describe the data and information made available thereby. In IBM Cognos examples, the metadata modeling program module 38 is integrated as a modeling studio client called Framework Manager, which supplies tools and other functionality to create and manage a metadata model file stored in XML (extensible markup language) format, in which the metadata definitions, data relationships, data filters, data-level access points, etc., are stored. The metadata model may also define new composite tables, or packages, to organize the data source definitions for publication and use in the business intelligence system. For instance, if the data sources provide multiple tables of customer information that collectively present data for a number of customer-related objects (e.g., customer name (CUST_NM), customer number (CUST_NO), and customer address (CUST_AD)), the Framework Manager module 38 may store the data source locations for each of the customer-related objects, create and store a new logically named item for each object (e.g., Customer Name, Customer Number, and Customer Address), and publish the metadata or subset thereof commonly referred to as a package in IBM Cognos for use within the architecture. More generally, the metadata modeling module 38 provides a tool for the metadata layer corresponding with data access and initial selection, or definition of the data framework and packages to be assimilated and integrated. The definitions of objects within this first layer of metadata for the business intelligence architecture may, but need not, be stored as an XML document or file within or outside of a database. The metadata model(s) may be set forth and stored in a variety of other languages or other formats.

In some cases, the version control systems and methods described below may be applied to capture the version history of the metadata model produced by the metadata model studio 38, or any subsets thereof (e.g., packages). Capturing a historical version of the model may provide a convenient way to view and compare the reports and other objects of the business intelligence environment as they existed under a different underlying metadata model.

The business intelligence environment is generally supported by a number of additional layers or types of metadata based on the metadata model. These layers are created or managed utilizing any number of program modules or services, such as the above-identified studios, implemented on, or provided by, the application server 30. For instance, selected subsets (e.g., packages) of the underlying metadata model may be selected in defining the reports, presentations and other elements of the user environment of the business intelligence architecture. In addition to report and other object definitions, this additional layer of metadata may also specify security information and other administrative aspects of the user environment. In IBM Cognos examples, this functionality is provided or supported by a content manager module 40 communicating with a metadata repository 42, which are generally responsible for storing and managing information, metadata, and data created for the business intelligence environment. More specifically, the content manager module 40 (or a similar non-IBM Cognos module) is used to handle communications with the metadata repository 42, to thereby manage the storage of customer application data, including security, configuration data, packages, metrics, layout and structure, and the object definitions for, and outputs of, reports, analytical views, scorecards, dashboards, event sequences, and other objects developed for the environment. The content manager module 40 is thus utilized in retrieving or storing a variety of object definitions, managing scheduling information, and managing the metadata models.

The layers of metadata defining and supporting the business intelligence environment are stored in the metadata repository 42, which may include or involve one or more databases or other data containers. The metadata repository 42 may be referenced herein as a content store, or content store database, for ease in describing and distinguishing different data repositories. The term "content store" is used, however, with the understanding that the metadata repository need not take the form of an IBM Cognos content store. In some cases, the content store 42 may be a relational database, but more generally utilize any data storage scheme. The content store 42 may be supported by any commercially available or open-source database program or DBMS, such as those available from IBM (DB2), Oracle, Microsoft (SQL Server), etc. In some cases, the metadata objects utilized by the business intelligence architecture to create the user environments and otherwise operate are stored in the content store 42 as binary large object (BLOB) fields. For example, the metadata for object definitions, or the tables of security settings, may be created and set forth via XML definitions, which are, in turn, saved as BLOBs or other database objects. To this end, the content manager module 40 may utilize an ODBC or JDBC API 44 to access the content store 42 and support communications with the particular type of database components utilized.

Communications with the metadata repository 42 are supported by a protocol to maintain the integrity of the metadata defining the user environments of the business intelligence architecture. More specifically, requests for data are sent to the metadata repository 42 in accordance with a communication protocol to ensure that access to the content store is controlled in a desired manner. Similarly, the communications containing the results of the data requests are also made in accordance with the communication protocol. In IBM Cognos examples, one communication protocol supported for communications with the content store 42 is the Simple Object Access Protocol (SOAP). As is well known to those skilled in the art, SOAP envelopes or documents present a format and platform for exchanging XML-based messages. In the example of FIG. 1, other authorized protocol(s) may correspond with those supported and utilized by the application server 30 and the JDBC API 44. In some cases, communications with the metadata repository 42 may utilize multiple protocols. As described below, the disclosed systems and methods utilize the communication protocol(s) of the server 30 and the content store 42 for integration and communication therewith. Further details regarding a SOAP-based example of the disclosed systems and methods are provided below.

Figure 2:
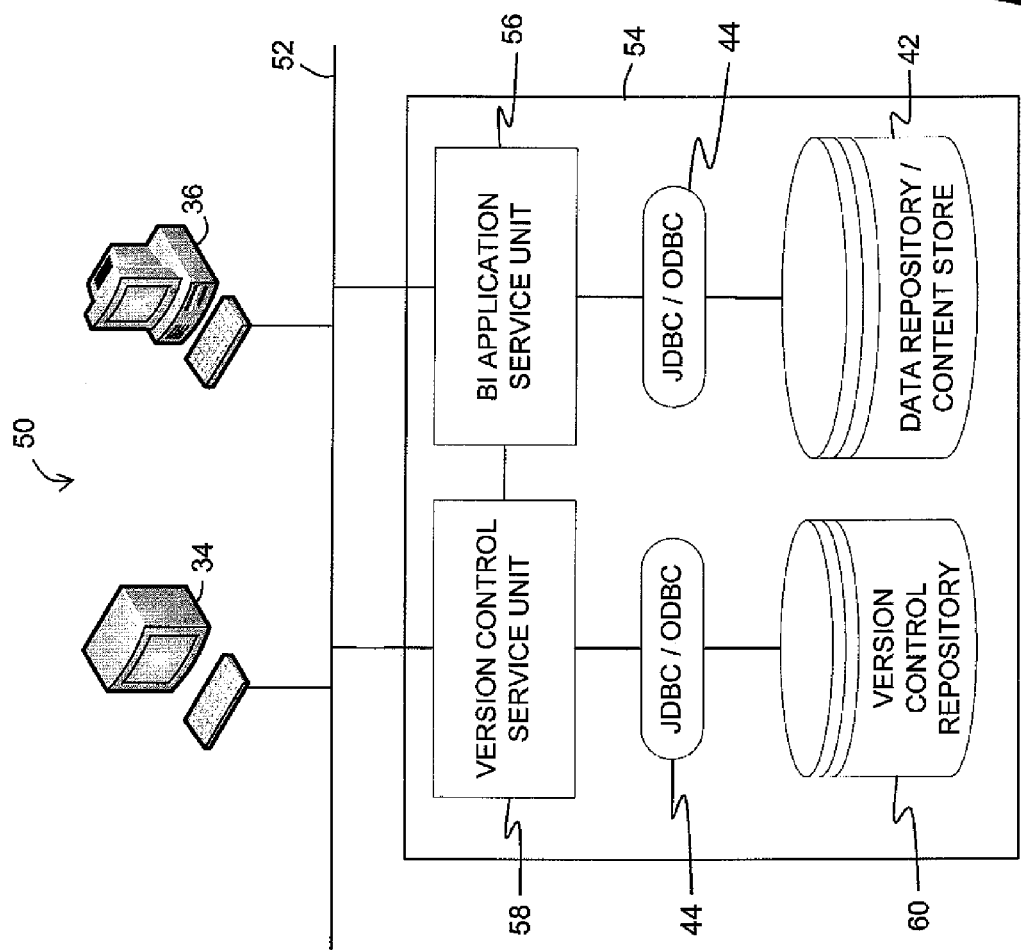
FIG. 2 is a schematic representation of one example of a business intelligence network of the business intelligence architecture of FIG. 1 integrated with an exemplary version control system for implementation of a version control service in accordance with several aspects of the disclosure.

With reference now to FIG. 2, one example of the version control systems and methods of the disclosure is shown in an integrated arrangement with a business intelligence system infrastructure generally indicated at 50. The system infrastructure 50 generally includes a network 52 for supporting communications between a number of computers, devices, and other units of the infrastructure 50. The network 52 may be configured in a variety of ways to carry communications, and is not limited to any particular communication technique, protocol, or medium. In this example, the network 52 may include a local area network configured to support Ethernet communications between the client devices 34, 36 and a server computer 54. Any number of client workstations or terminals may be coupled to the network 52, and need not be limited to the exemplary types shown. Similarly, any number of devices may be coupled to the network 52 for providing the server functionality, and need not be limited to a particular type of server computer, device, or configuration.

The server computer 54 includes a number of service units providing application or other software services for networked implementation via browsers of the client devices 34, 36. In this single server configuration, the server computer 54 includes a business intelligence application service unit 56 directed to implementing business intelligence services and the content store 42 with which the service unit 56 communicates to support those services. In this way, the service unit 56 may support the generation of one or more studios or other authoring interfaces providing the tools to develop object definitions for the elements of the business intelligence environment encountered by end users. In accordance with one aspect of the disclosure, the server computer 54 also includes a version control service unit 58 in communication with the business intelligence application service unit 56 to support the version control operations in connection with the object definitions. The version control service unit 58 is generally configured to store multiple versions (i.e., current, previous, and past versions) of the object definitions for the business intelligence environment in a version control repository 60, as described further below. The content store 42 and the version control repository 60 may include or be contained within separate memories or data storage devices as shown, or alternatively reside on a shared memory or storage device of the server computer 54. Similarly, the service units 56 and 58 may be installed in separate directories on a single drive (not shown) or other memory or device of the server computer 54

(or multiple server computers). The version control repository 60 and the content store 42 need not reside on the same server computer 54 as shown.

Figure 3:
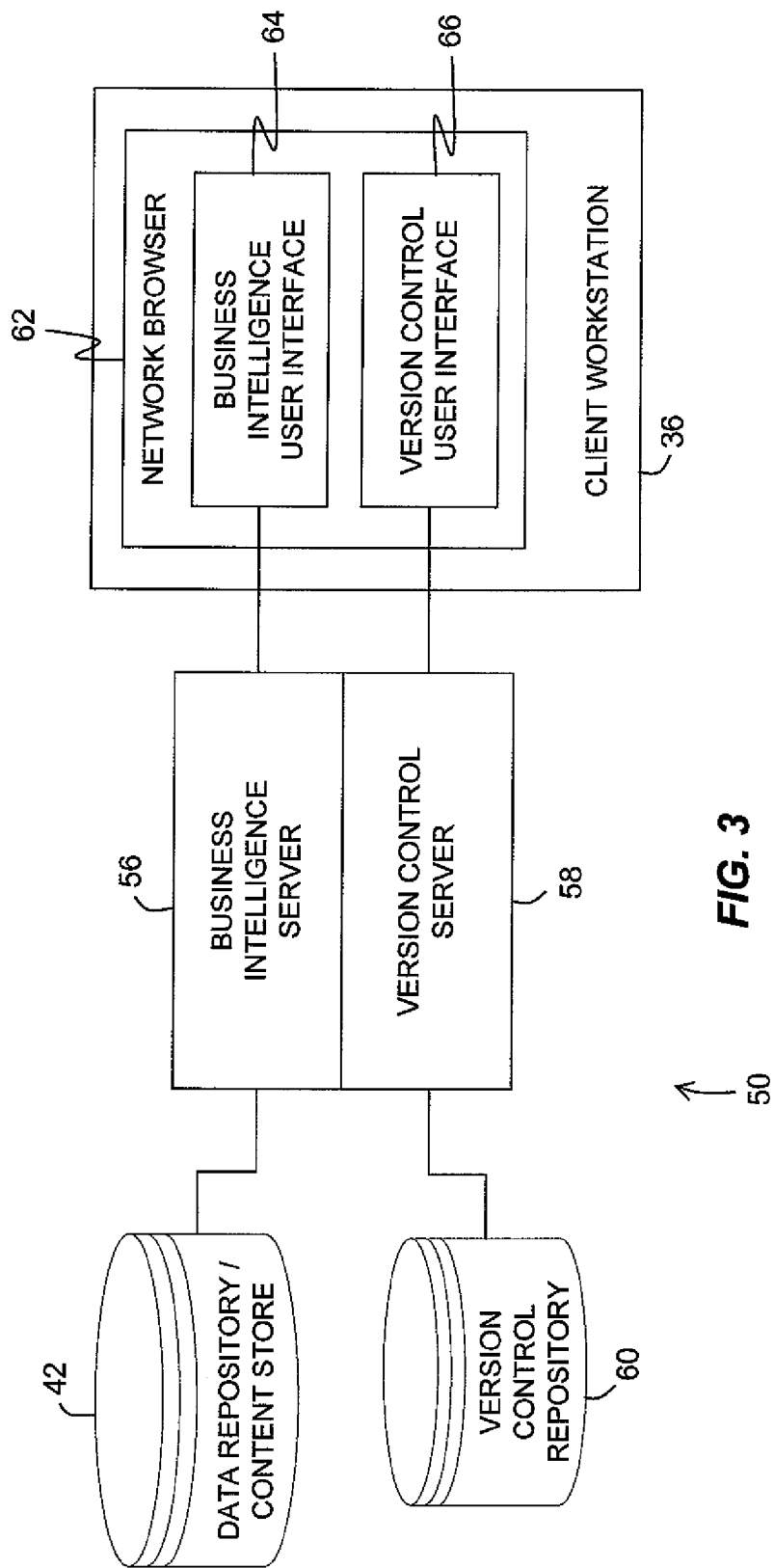
FIG. 3 is a schematic representation of another example of a business intelligence network of the business intelligence architecture of FIG. 1 integrated with an exemplary version control system in a manner transparent to a client workstation via a network browser.

Turning to FIG. 3, another view of the exemplary business intelligence system infrastructure 50 is shown to depict the manner in which the disclosed version control systems and methods are integrated within a client-server framework of the system infrastructure 50. The client workstation 36 includes a network browser 62 to support the generation of a number of user interfaces (or user interface displays) 64 of the business intelligence environment. The browser 62 and other browsers referenced herein are not limited to a particular type, configuration, product, or software technology, and instead should be understood to include any client-side rendering agent suitable for use within the business intelligence architecture. In accordance with one aspect of the disclosure, version control operations are provided via a number of add-on user interfaces (or user interface displays) 66 also provided via the network browser 62. The user interfaces or displays 64, 66 are generated via respective sets of textual instructions residing on the business application service unit 56 and the version control service unit 58. For example, the business intelligence service unit 56 may have a number of markup language or script files stored in a memory of the server computer 54 (FIG. 2) defining one or more of the user interfaces 64. Similarly, the version control service unit or server 58 may have a number of markup language or script files stored in a memory of the server computer 54 (FIG. 2) defining one or more of the add-on user interfaces 66 for version control operations. As described below, the definitions of the user interfaces 64, 66 may also be integrated, such that a single file or group of instructions includes portions or sets directed to elements of both the business intelligence user interfaces 64 and the add-on user interfaces 66. In these ways, the add-on nature of the user interfaces 66 may correspond with an element or operation added to an existing user interface 64 and not necessarily with a separate user interface 66 directed solely to version control operations. In these ways, the network browser-based nature of the client-server framework generally supports the integration of the version control interfaces, operations and features. The version control server 58 may also include any number or type of additional computer software programs or modules to implement various tasks involved in the version control operations, including, for instance, sending data to, and communicating with, the version control repository 60. These computer programs may be stored on the version control server 58 in a compiled or executable form and written in a variety of programming languages, including for instance C#.

The disclosed version control systems and methods generally provide extensions to the business intelligence environment and the user interfaces 64 thereof for real-time implementation of version control operations and features. As described in connection with the examples set forth below, one extension involves interjecting a version control storage operation into the workflow of the user interfaces 64. In this case, each time a user directs the business intelligence service unit 56 to store, or save, an object definition, the version control storage operation is implemented to direct the version control server 58 to also store a copy of the definition in the version control repository 66. In this way, each saved version of the object definition is preserved in the version control repository 66. One or more additional extensions may be directed to supporting or providing operations that allow a user to view and manage the object definitions of the previous versions. As a result, access to, and use of, the features, operations, and data of the disclosed version control systems and methods are provided from within the business intelligence user interfaces 64.

In this example, the version control service unit 58 includes middleware configured to support data storage operations and other communications with the version control repository 66. After the version control data is stored, the middleware and other components of the version control service unit 58 accept commands received via the user interfaces 64, 66 to implement a number of version control operations. As described below, these operations may include or involve managing the version control data in a variety of ways. Before accessing the version control repository 66 to load or store data, the version control service unit 58 and the version control repository 66 may communicate with the business intelligence service unit to gather preliminary information regarding the environment, including, for instance, security information. In this way, security restrictions may be applied to any external attempts to access the version control repository 66.

The version control repository 66 is generally configured as a data warehouse where each version of an object definition can be archived or stored for historical and other purposes. To these ends, the version control repository 66 may include or utilize a predefined database or data storage scheme, which may be configured and supported via a variety of commercially available or open-source database applications. For example, the version control repository 66 may be configured as a Microsoft SQL Server database via the SQL Server Management Studio software made available from Microsoft Corp. Other examples may utilize Oracle, mySQL, DB2, or any desired file system (Windows, Unix, Linux, etc.). Generally speaking, practice of the disclosed version control systems and methods is not limited to a particular data storage scheme, data container, or other parameter of the database service, application, or device of the version control repository 66.

As shown in FIG. 3, some embodiments of the network infrastructure 50 may include separate storage devices for the content store 42 and the version control repository 66. The content store 42 and the version control repository 66 may also reside on different nodes of the network 52 than the service units 56, 58. Despite this distribution of the storage repositories of the business intelligence and version control functions, the separation is transparent to users due to the nature of the client-server framework. The transparency also results from the integrated nature of the version control systems and methods of the disclosure, inasmuch as the version control services are presented in the form of a user interface that does not require running a separate program. Instead, the disclosed version control systems and methods are implemented via the network browser 62, i.e., the same software framework and session used to provide the business intelligence services.

Figure 4:
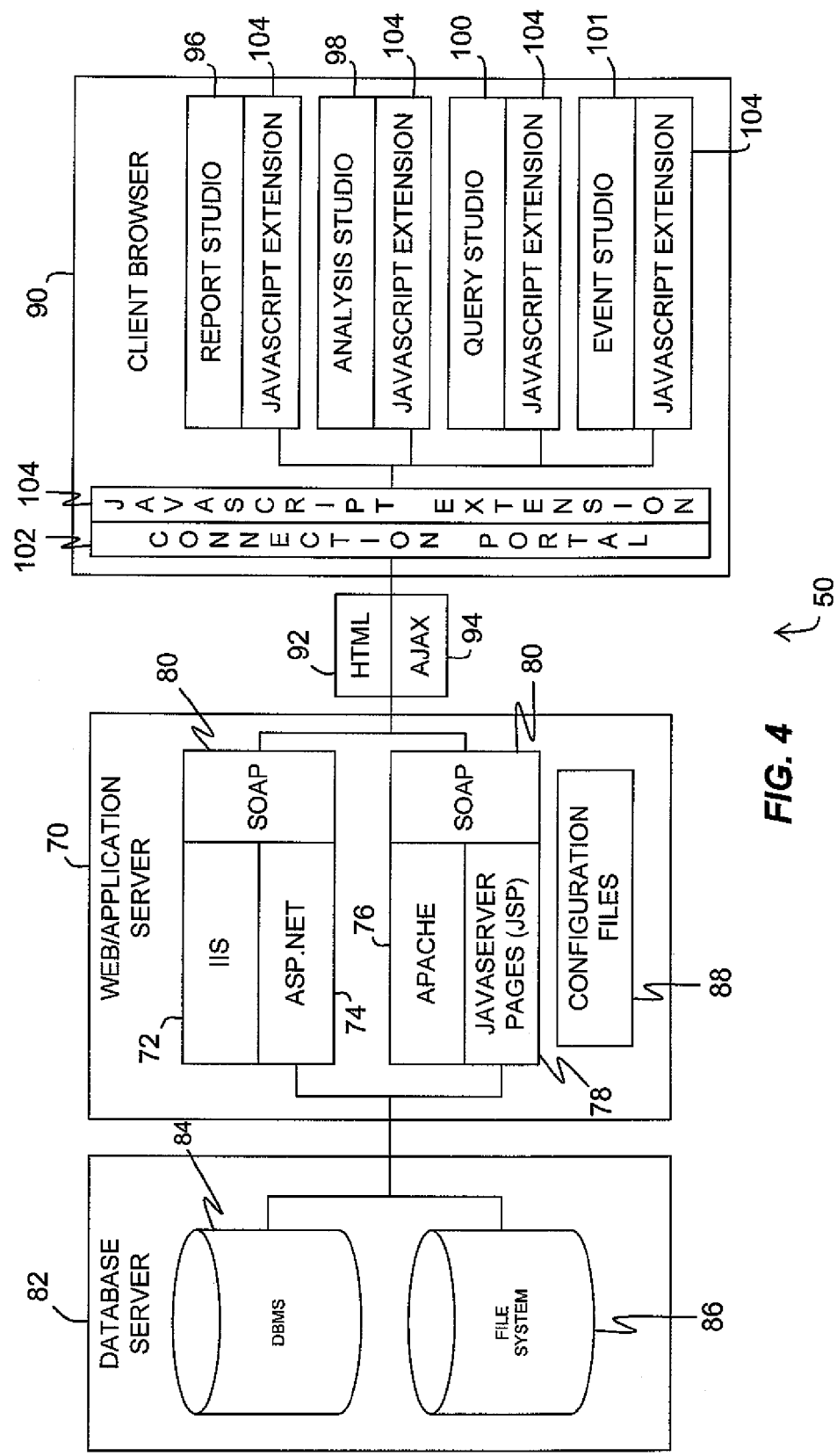
FIG. 4 is a schematic representation of one example of a software module arrangement of the integrated business intelligence network of FIG. 3 to depict a client-server framework thereof in greater detail.

FIG. 4 presents another view of the exemplary business intelligence system infrastructure 50 to depict further aspects of the service-oriented architecture thereof, as well as further ways in which the disclosed version control systems and methods are integrated therewith. In this view of the system infrastructure 50, a number of network communication and other software layers of the client-server framework are highlighted. In this example, the server and data storage functions of both the business intelligence and version control systems are supported by, and implemented via, a common set of network communication and other software modules and technologies. For example, a web, network, or application server 70 may be configured with a number of middleware components to support the network distribution and implementation of the functions of both the business intelligence and version control service units 56, 58 (FIG. 3). In this example, the web/application server 70 includes two sets of web server software packages to support web or other network communications. An IIS (Internet Information Services) web server module 72 is coupled with an ASP.NET application framework to support the building of dynamic web sites, web applications, and web services. Alternatively, an Apache HTTP server module 76 and a JSP-based (JavaServer Pages) rendering engine 78 provide another example of a web server framework for Windows and non-Windows operating systems. Both frameworks may issue network communications via the SOAP protocol. Accordingly, a SOAP communication layer 80 may form a foundation of the web services stack of each framework. These and other details regarding the web or network services of the client-server framework of the system infrastructure 50 are provided with the understanding that they are exemplary in nature. Practice of the disclosed version control systems and methods is not limited to any particular web server framework, web services protocol, or protocol stack.

As shown, the ASP.NET and JSP modules 74, 78 are also used in connection with communications with a database server 82 that may support one or both of the content store 42 (FIG. 3) and the version control repository 66 (FIG. 3). The database server 82 generally includes a set of software layers utilized to support operations with the database systems of the content store 42 or the version control repository 66. In this example, a set of database management services or data access interfaces 84 under the ADO.NET or JDBC standards may be provided for use with the ASP.NET- and JDBC-based servers 74, 78. More generally, these interfaces 84 may be used to access data and implement data services in connection with one or more database file systems 86. These and other details regarding the database services are provided with the understanding that they are exemplary in nature. Practice of the disclosed version control systems and methods is not limited to any particular database communication protocol, database service, or database file system.

The web/application server 70 may also include one or more configuration files 88 to specify information such database connection strings, user names, and passwords for the databases. Examples of these files commonly include but are not limited to web.config (ASP.NET) and config.xml (JSP).

Generally speaking, the web or network services provided by the web server 70 utilize textual instruction sets to direct the generation of user interface screens, displays or other elements in a browser-based client interface 90. The client interface 90 may correspond with, include, or work in conjunction with, a set of client-side communication and other software modules implemented in connection with the browser-based framework of one of the client devices (e.g., the client terminal 34 or the client workstation 36 of FIG. 1). Using these browser technologies, the browser of the client interface 90 generates or renders a number of user interfaces in accordance with the textual instructions or instruction sets provided by the web server 70. These instructions may be set forth in any one or more of the different markup languages or script languages supported by the browser(s) running on the client desktop 90. In the example shown, the web server 70 passes both an HTML (HyperText Markup language) markup file 92 and a Javascript file 94, which may, for instance, use asynchronous Javascript (AJAX) techniques to control the network browser and support the functionality incorporated into the user interfaces.

FIG. 4 depicts an IBM Cognos-based example in which the disclosed version control systems and methods are integrated with Report Studio interfaces 96, Analysis Studio interfaces 98, Query Studio interfaces 100, Event Studio interfaces 101, and an IBM Cognos Connection interface 102 of the client desktop 90. Each one of these interfaces is defined via one or more respective text-based or textual instruction sets. The instruction sets may, but need not, be arranged in respective files. Some instruction sets may include multiple files associated with function calls specified in a main or principal instruction file. The instruction sets may be set forth in any markup, scripting, or other textual language, including without limitation HTML, XML, Javascript, VBScript, and other client-side scripting languages. In some cases, an instruction set may include more than one language (e.g., an HTML file with embedded Javascript). The term "textual" is used herein in a broad sense to cover items including or incorporating text or text-based information to any desired degree.

In accordance with one aspect of the disclosure, version control features and operations are integrated within each studio or interface presented via the client desktop interface 90 through modification of one or more of the respective instruction sets that define the studio or interface. In this way, version control is seamlessly integrated with any component of the business intelligence environment. As will be described further below, one example of a modification involves a save or storage operation of the studio or interface. The textual instructions defining a button or menu command directed to initiating the save operation are modified to implement the version control operation(s). In that case, some or all of the modifications are embedded within the instruction file (or other set) defining the studio or interface. Other examples may instead involve additional instruction sets or files that define interface elements to be added to the studio or interface. As shown in the example of FIG. 4, each studio or interface includes a Javascript extension 104 directed to generating a new button or menu command for a version control feature. In this way, each studio or interface may be reconfigured to make a "View revision history" operation button or command available via the user interface. Notwithstanding the foregoing and following description of the integration of the disclosed version control methods with a studio, practice of the disclosed version control methods is not limited to use within a studio. Other content neither created nor edited within a studio may also be versioned in accordance with the disclosure. Thus, the disclosed version control systems and methods are not limited to versioning objects that are reports or other presentations of enterprise data. They may be extended to version the metadata of an object such as properties like name, description and owner. They may also be extended to version objects that are generally useful in a business intelligence environment but are not themselves reports, such as jobs, URL Links, shortcuts, portal tabs, data sources, etc.

Figure 5A:
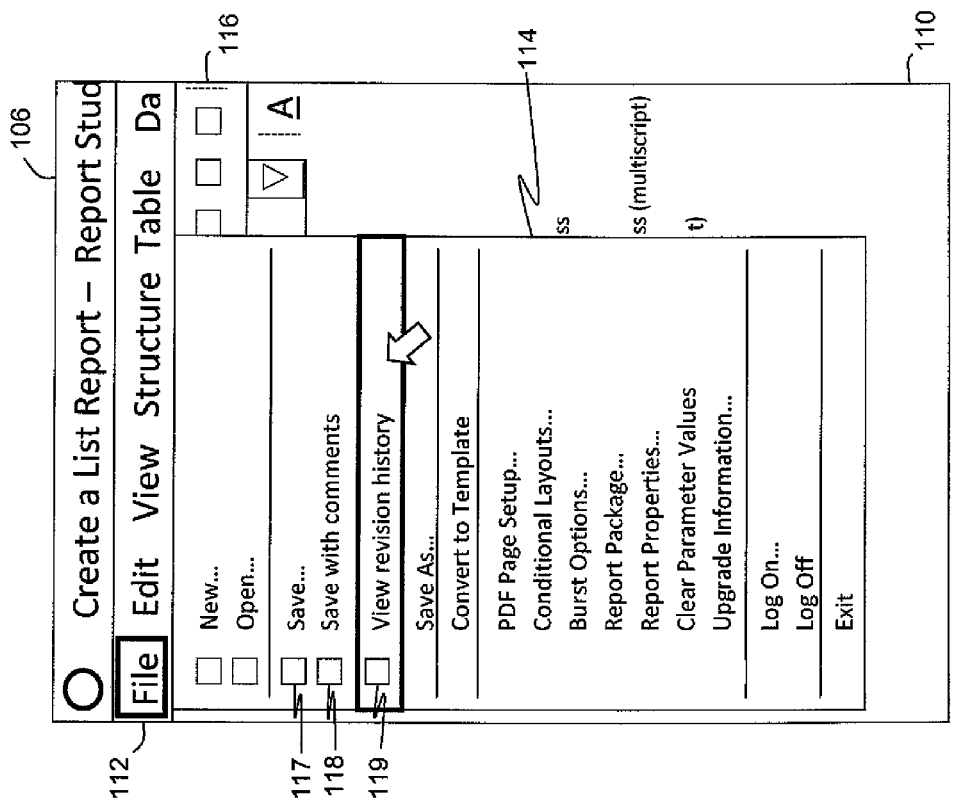
FIGS. 5A and 5B are simplified representations of exemplary browser interfaces (i) generated by the software module arrangement and client-server framework depicted in FIG. 4, and (ii) configured to support version control operations in accordance with one or more aspects of the disclosure.
Figure 5B:
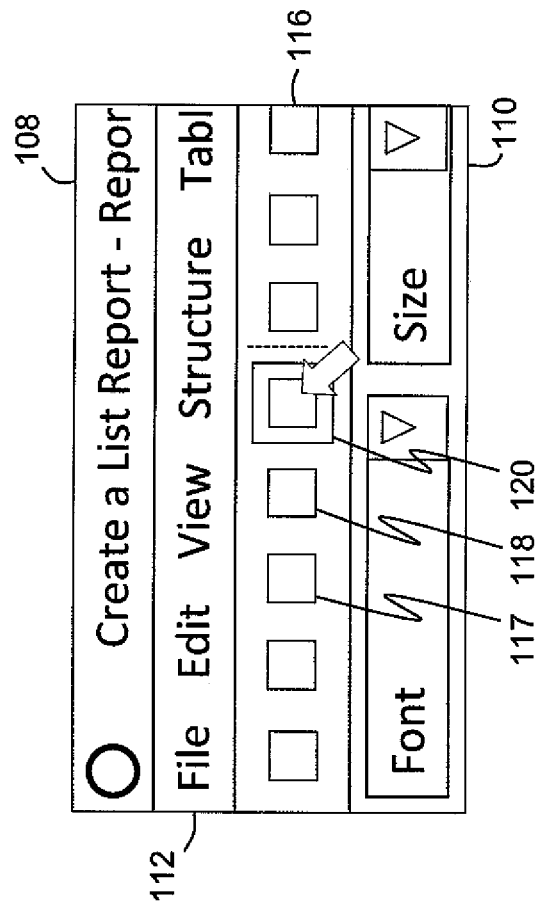

FIGS. 5A and 5B provide examples of the integrated version control functionality of the disclosed systems and methods in connection with interface screen capture excerpts 106, 108 of a Report Studio session implemented via a client browser. Each screen capture excerpt 106, 108 shows a display window 110 of the session having a command menu system 112 with multiple drop-down menus. In FIG. 5A, a File menu 114 presents a New command for creating a new report definition, an Open command for opening a previously created report definition, a Save command for storing a representation of the report definition in the content store, and a Save As command for storing and specifying a name of the report definition. Several of these commands are also made available in a toolbar 116 best shown in FIG. 5B.

In accordance with several aspects of the disclosure, a number of version control features and operations are integrated into the storage-related elements of the user interface display of the Report Studio session. In this example, both the Save and Save As commands have been modified to provide instructions for version control. In these and other ways, the disclosed systems and methods can provide historical versioning operations and functions from within the Report Studio interface. There is no need for the user to access or run a different program, application, interface, or process. As described further below, the integrated operations and functions both serve to capture the version information in real-time and provide user interface functionality for reviewing and managing the life cycle of a report (or other business intelligence system artifact), including possible reversion or recovery of older versions. To incorporate these features, the markup language and other textual instruction set(s) used to render or generate the Report Studio session are generally modified as described further below. For example, the instructions or instruction set(s) underlying a Save command initiated via a toolbar icon, menu item, or other button or element 117 have been altered such that the operation of the Save command includes the version operation(s). Thus, whenever a user saves the report definition, the modified instruction set will direct one or more of the above-described service units to store a copy of the report definition in the version control repository. The version control service unit may also capture the current timestamp, the current user's account information, and a unique identifier, to establish a relationship between the captured version and the object definition stored in the content store and thereby archive this metadata in the version control repository in association with the version.

FIGS. 5A and 5B also depict another aspect of the disclosed version control systems and methods in which the user interfaces provide an opportunity to save a version of the Object definition with user-provided comments. As further described below, this example also includes a "Save with comments" operation or command initiated by a toolbar icon, menu item, or other button or interface element 118 that provides further version control functionality. Initiating this save operation generally causes further version control instructions to be implemented, including for instance the generation of a display panel prompting the user to provide notes on the version being saved. In this way, an author of the report definition can annotate each version with comments regarding why the report definition was modified and the substance of any changes.

Generally speaking, the integrated nature of the version control systems and methods allows most, if not all, of the version storage workflow to be implemented behind the scenes in a manner transparent to the user of the Report Studio session. For example, selection of the save command stores the version in the version control database in a manner transparent to the user. Thus, one exception involves those cases or examples where the user is provided with an opportunity to store notes in the version metadata.

FIGS. 5A and 5B also depict another aspect of the disclosed version control systems and methods in which the user interface display screens provide an opportunity to view previous versions stored in the version control repository. To this end, the instruction set(s) for rendering the user interface display of the Report Studio session are further modified to include instructions directed to generating and presenting an extension of the drop-down menu 114 to include a command menu item 119 (FIG. 5A). Similarly, the toolbar 116 is extended to include a toolbar button 120 (FIG. 5B). In these examples, the command menu item 119 is presented as a "View revision history" option. Selection of this option may then cause the embedded instructions to execute a function call or otherwise access further instructions or instruction sets directed to providing the features of the option. Generally speaking, implementing the operation allows a user to access the version history stored in the version control repository. When the operation is invoked, the version control service may determine the report or other object definition associated with the request. For example, the service may look to the context of the business intelligence environment, such as the current report opened within the Report Studio. The service may also look to further information regarding the Report Studio session to determine what level or type of access, if any, the current user has to view the version history for the selected report. The credentials of the current user are passed to the business intelligence server to gain access to the content store. In IBM Cognos examples, the session ID may be used to identify the current user and the current session. In these and other ways, the integration of the disclosed version control systems and methods intrinsically incorporates the security protections and information of the business intelligence environment.

Further details regarding the implementation of the version history operation are now provided. Upon determining the current report and user access rights, the version control service may then issue a query to the version control repository to retrieve the version history information. Assuming the user has the appropriate credentials, the version control service renders or generates a user interface display that includes a window or panel presenting the version history information retrieved from the version control repository. As shown in the examples of FIGS. 9A and 9B, this presentation may include a table listing or identifying the historical versions of the selected report. Each historical version may be listed with further information associated therewith, such as the version storage date, the name of the account that implemented the storage operation (e.g., the saving author), information regarding the modifications to the object definition, and any annotations entered by the author.

As described further below in connection with several examples, the user interface display may then enable the user to browse the list of historical versions and invoke various version history management operations upon selecting one or more of the versions via checkboxes and the like, including: (1) previewing the output of a selected historical version after being processed by the rendering or other processing engine of the business intelligence environment; (2) opening a preview of a selected version in a new session of Report Studio (or one of the other business intelligence authoring modules or applications); (3) viewing the object definition of the historical version; (4) viewing a comparison of the object definition of the historical version and the current version stored in the content store; (5) viewing a comparison of the visual output of the historical and current versions using the rendering or other processing engine of the business intelligence environment; (6) distributing the visual output of the historical and current versions and associated documentation of the variances to a third party for audit or compliance purposes; (7) reverting back to a selected historical version (e.g., by promoting a copy of the selected version as the current version in both the content store and the version control repository); and, (8) deleting a selected historical version from the version control repository. These and other version history management features of the disclosed version control systems and methods may be generally provided without revealing to the author (or user) that a separate version control service is implementing the operations, or that the version history is stored outside of the business intelligence system in the version control repository. In this way, the nature of the integration of the version control systems and methods is transparent to the user.

Figure 6A:
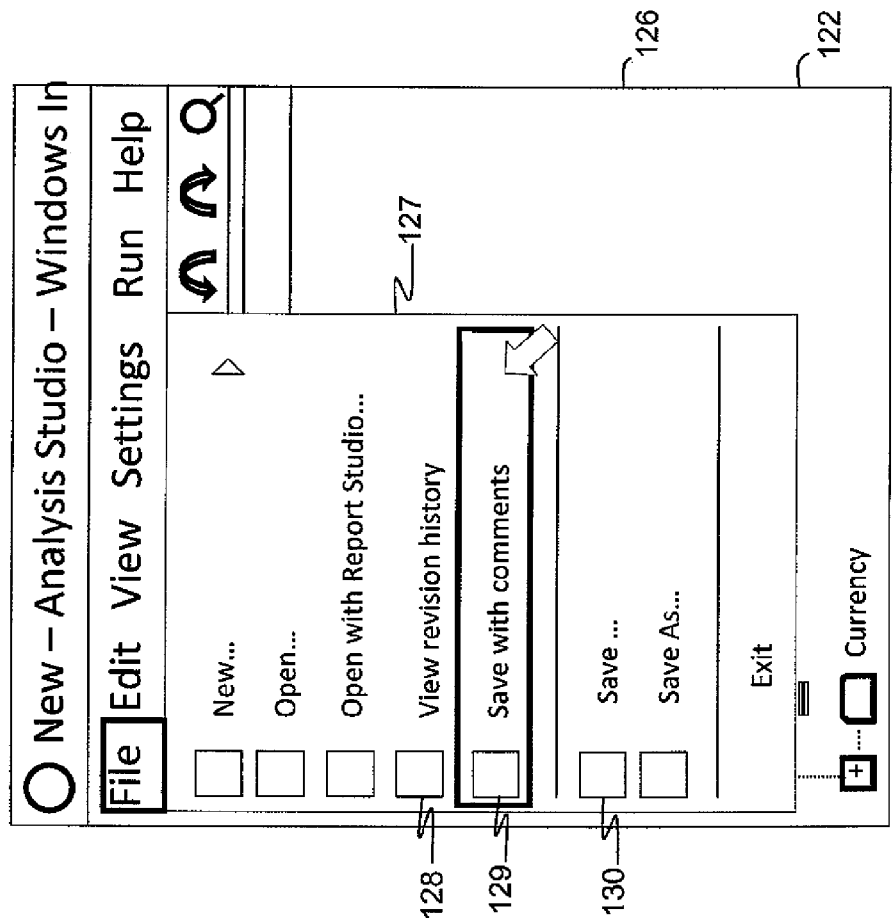
FIGS. 6A and 6B are simplified representations of further exemplary browser interfaces (i) generated by the software module arrangement and client-server framework depicted in FIG. 4, and (ii) configured to support version control operations in accordance with one or more aspects of the disclosure.
Figure 6B:
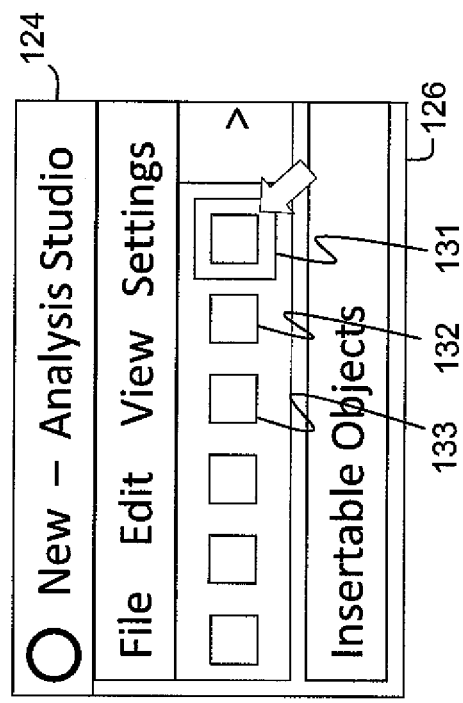

FIGS. 6A and 6B depict examples of similar version control extensions of the user interface displays of an Analysis Studio session implemented via a client network browser. The set of user interface displays generated in an Analysis Studio session are generally directed to creating a framework for an analytical presentation of the enterprise data, such as a crosstab layout or table. The version control operations described above may then be applied during the creation, editing, and development of the object definition of the table or other framework. In this way, an Analysis Studio development session provides another example of an object of the business intelligence environment suitable for version control in accordance with the disclosure. More specifically, FIGS. 6A and 6B show interface screen captures 122, 124 to provide examples of the integration of the version control features in a display window 126 of the session. As shown in FIG. 6A, a command menu 127 is extended to include a "View revision history" menu item 128 and a "Save with comments" menu item 129 in addition to a "Save" menu item 130. The same operations may be invoked via corresponding toolbar buttons 131-133 shown in FIG. 6B. As described above, the instructions or instruction sets underlying the Save and "Save as" commands have been modified such that implementation of the commands causes the above-described version control functionality to be implemented as well.

Figure 7:
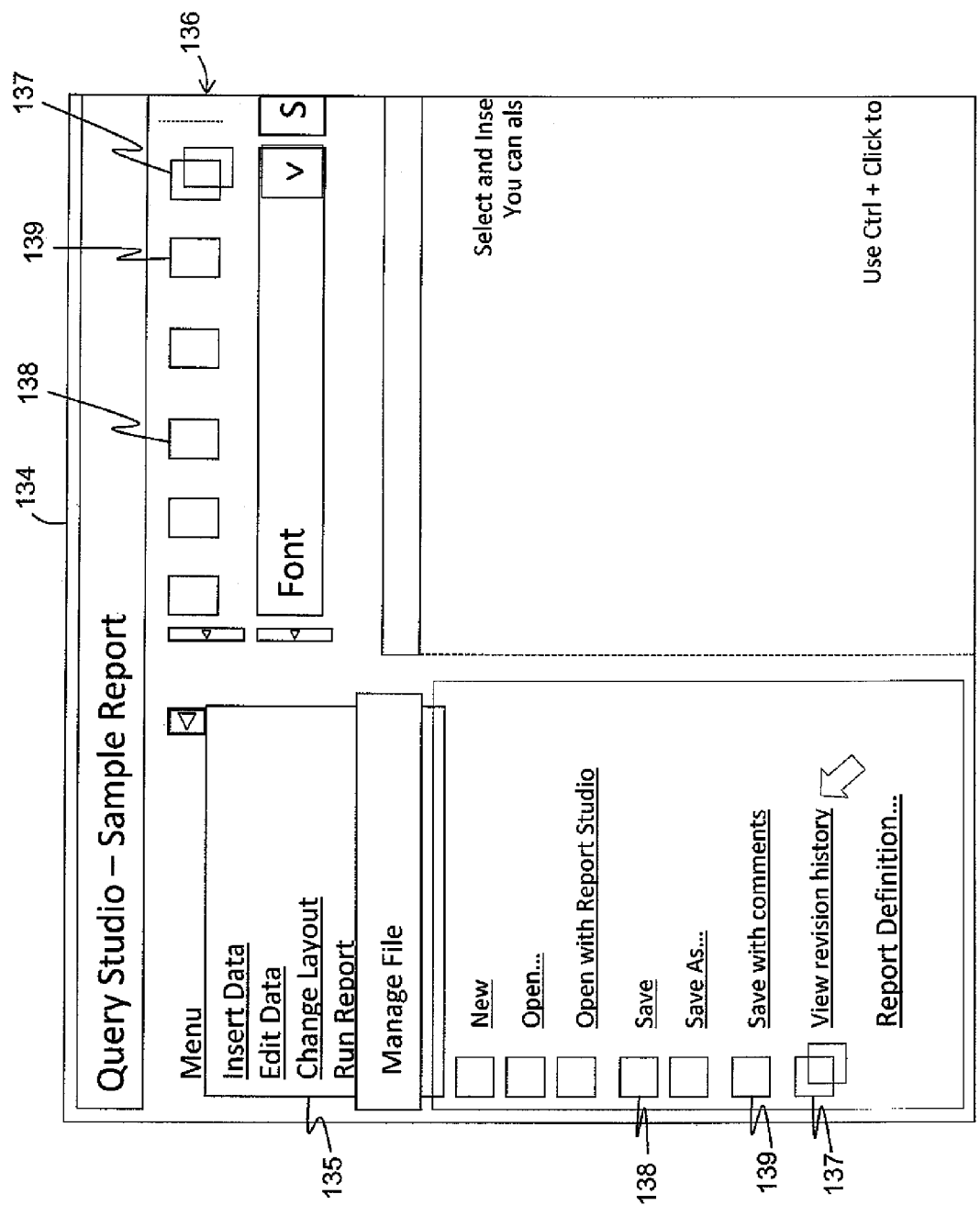
FIG. 7 is a simplified representation of yet another browser interface (i) generated by the software module arrangement and client-server framework depicted in FIG. 4, and (ii) configured to support version control operations in accordance with one or more aspects of the disclosure.

FIG. 7 depicts yet another example of the integration of the version control operations in connection with another module of the business intelligence environment implemented via a client network browser. In this example, a user interface display 134 of a Query Studio session includes a sidebar or column menu 135 and a command icon row 136 for creating or authoring a query used to gather or filter business intelligence data. The object definition of the query is stored as an object in the content store in a manner similar to the storage of other object definitions of the environment, including the definitions of the reports and analysis presentations created via the above-described modules. As a result, the disclosed version control systems and methods may also be applied in this context to retain a version history for each query. In this example, both the sidebar menu 135 and the command icon row 136 are extended to include respective "View revision history" command buttons or links 137. Selection of either link 137 may result in the implementation of the features described above in connection with the Report Studio and Analysis Studio sessions as applied to the current query open within the user interface display 134. Similarly, the instructions or instruction set(s) underlying a Save command implemented via respective links 138 have been altered such that the operation of the Save commands includes the version operation(s). The functionality of the "Save as" operation may be similarly modified. Further, the instructions or instruction set(s) underlying the "Save with comments" command implemented via respective links 139 have been installed and integrated such that the operation of the of the "Save with comments" command will result in the implementation of the features described above in connection with the Report Studio and Analysis Studio sessions as applied to the current query open within the user interface display 134.

The example of FIG. 7 shows how integration of the disclosed version control systems is not limited to any particular type of user interface display type, window configuration, menu system, or tool icon arrangement.

The example of FIG. 7 also shows how the disclosed version control systems and methods may be applied to any object definition created within the business intelligence environment. Objects that can be versioned in accordance with the disclosure include any artifact of the business intelligence environment, regardless of whether an authoring studio or other interface is dedicated to the creation thereof. For instance, IBM Cognos jobs, schedules, agents, events, and other routines that may be retained for future use within the business intelligence environment may also be versioned because the sequence of events, actions, or steps are also stored in the content store as an object definition. The objects subject to version control are not limited to those that are solely created or defined by a user, insofar as a job, schedule, agent, event, or macro routine may be created automatically by the business intelligence system as it tracks or otherwise analyzes actions taken within the environment. It follows that object definitions of the environment need not be stored as a result of a "save" or other storage operation initiated by a user. Instead, the object definitions may be retained as a result of a user selecting an "OK" button or some other user acknowledgement before or after, for instance, the implementation of a sequence to be retained. Furthermore, the objects need not be stored in any particular format or configuration, nor must the definitions be set forth in any particular programming, scripting, or markup language. In the IBM Cognos examples described above, the object definitions may be stored as BLOBs as described above, and the object definitions may be set forth in XML, but other embodiments may store and format the objects in any desired manner. For instance, the content and other definitions within an object definition may, but need not, be set forth in any textual language or scheme. However, in that case, the reproduction of the text of the object definition does not involve a complex rendering engine or conversion and, thus, the object definition can be easily presented for comparisons and analysis.

Figure 8A:
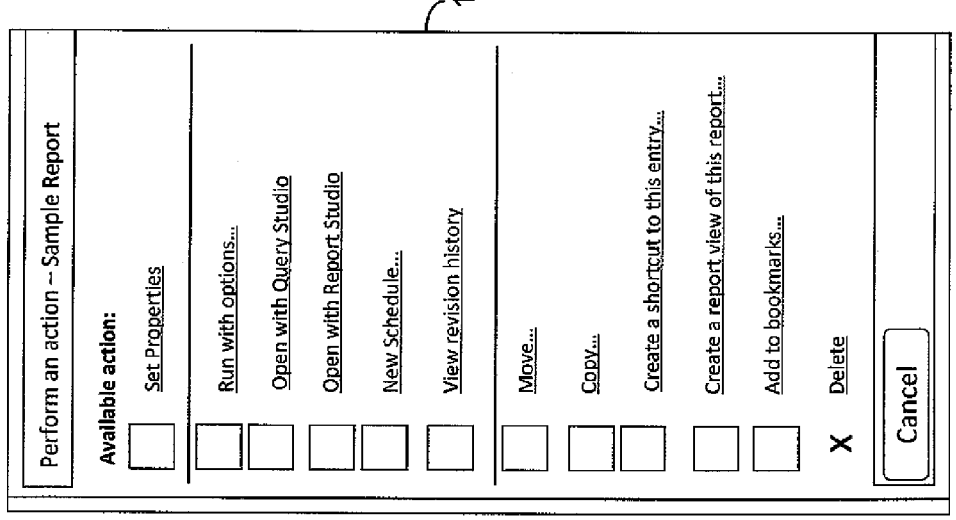
FIGS. 8A and 8B are simplified representations of still further exemplary browser interfaces (i) generated by the software module arrangement and client-server framework depicted in FIG. 4, and (ii) configured to support version control operations in accordance with one or more aspects of the disclosure.
Figure 8B:
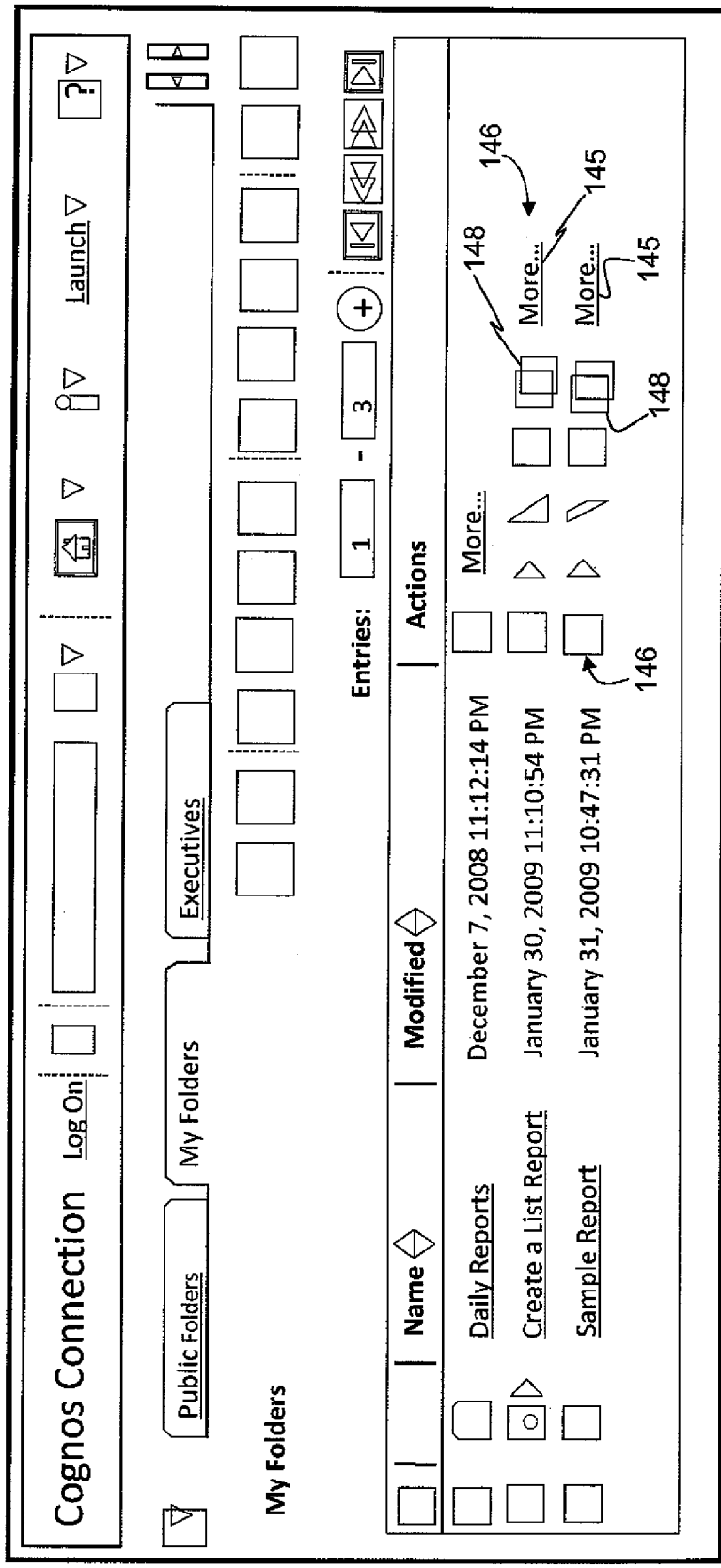

With reference now to FIGS. 8A and 8B, yet another example of the integration of the disclosed version control systems and methods is provided in connection with a portal of the business intelligence environment. The portal may correspond with the IBM Cognos Connection portal used within the IBM Cognos environment as a way to access other modules and content, such as the studios described above, to open a specific object within one of the studios for editing and other tasks, or to execute the object definition to view the results, etc. To these ends, the portal includes a number of panels that may be generated within an interface display to provide options to navigate the business intelligence environment. FIG. 8A depicts a menu panel 142 of available operations and commands, while FIG. 8B depicts a panel 144 that provides a graphical view of the available content within the personal workspace of a user of the business intelligence environment. The panel 144 may be one of several panels accessed via tabs that separate content made available on either a public basis ("Public Folders") or on a private basis ("My Folders"). In this example, the panel 142 of FIG. 8A is generated when a user selects a "More . . . " option via a link 145 shown in FIG. 8B.

The panels 142, 144 of the portal interface have been modified to integrate and present one or more aspects of the disclosed version control methods. The panel 142 includes a "View revision history" command option that may implement a routine similar to that invoked by the above-described command options of the same name. The panel 144 provides opportunities to initiate various operations for a specific object via an icon list 146 within the graphical view of the objects. An icon 148 corresponds with one of the operations available for each listed object, the selection of which also initiates the "View revision history" operation. To these ends, the textual instructions or set(s) that define the user interface display(s) of the portal are modified to include instructions directed to extending the interfaces to incorporate version control, as described above.

The exemplary user interface display depicted in FIG. 8B reveals another advantageous result of the integration of the disclosed version control systems and methods within the business intelligence environment. Integration of version control in accordance with the disclosure generally covers both public and private content (e.g., metadata) within the business intelligence environment. That is, version control is made available and compatible with objects regardless of whether the content of the object is publicly available (e.g., within a public folder) or whether it is only privately available to a specific user (e.g., within each user's My Folders private collection or area). This aspect of the disclosed version control systems and methods is especially useful because developers of reports and other content may store objects in a user's individual or private area before releasing it for use by other end users. Practice of the disclosed version control methods in connection with work in the individual area in this way is a practical development step, as it provides a personal workspace for the authoring process. As a result, significant and numerous versions may be created within the personal workspace. Access to the public and private folders need not be made available via the tabs as shown.

The accessibility of both public and private content within the business intelligence environment is enabled by the integrated nature of the version control systems and methods. The security features of the environment that would otherwise limit or prohibit access to a personal workspace (or an area of the public space requiring security clearance) are inherently a part of the version control system. Because no separate version control application needs to be run, there is no need for a separate security clearance. That is, the version control functionality relies on the security checks that allowed the user to open the portal and the My Folders area in the first place. If the user has access to a folder, document, or other artifact of the environment, the user also has access to past versions thereof as well.

The above-described intrinsic security of the disclosed version control systems and methods may, but need not, also benefit from a centralized storage of the private content of a specific user. In IBM Cognos examples, the object definitions for items stored in the My Folders area are still retained in the content store rather than locally on a client workstation. While such centralized storage is helpful, other embodiments may the object definitions stored in any distributed fashion. It follows that the content store of the business intelligence network need not reside in a single location, but may be distributed in nature as well.

FIGS. 9A and 9B depict exemplary user interface display panels or windows 150 and 151 that may be generated as a result of the initiation of a version history viewing operation. In this example, the panel 150 (FIG. 9A) may be initially generated by selection of one of the exemplary menu commands or toolbar icons described above. The panel 150 then displays each of the versions saved with comments via the commands described above. The comments for each version are presented in a Notes column 152 of a table 153 of the panel 150. The panel 151 (FIG. 9B) may then be generated by selection of a "Show all versions" link in the panel 150 to reveal each saved version, either with or without comments, in a table 154. Thus, in this example, the panel 150 shows the portions of the version history where user comments have been associated with the respective object definitions, while the panel 151 shows the object definitions both with and without associated user comments. This example of the implementation of the view revision history operation is provided with the understanding that the operation and output thereof may vary considerably from that shown.

The tables 153, 154 also include a checkbox column 155 for version selection, an account column 156 to identify a user responsible for the save operation, and an action item column 158 to present various operations available to manage a selected version. The actions may include one or more of the management functions identified above, including, for instance, version previewing, version opening in a new studio session, version promotion, version restoration, version deletion, and version comparison. One or more of the actions may also or alternatively be made available as links listed below the table 152 as shown.

Both of the tables 153, 154 may be editable to provide an opportunity for a user to add or edit comments to a previously stored version. In this way, a user may store a version with comments even though the version was initially stored via the save command, i.e., without comments. To these ends, the panels 150, 151 also include a "save" command button 159 to send data indicative of the added or edited comments to the version control repository.

The generation of the panel 150 involves the implementation of a version history instruction set inserted within, appended to, or called from within a modified version of one of the textual instruction sets used to render the business intelligence client user interface via a network browser. For example, the panel 150 may be generated as a pane within a window of the business intelligence user interface or as a separate window as shown. The generation of the panel 151 may, in contrast, involve the implementation of an instruction set of the version control system, as described below.

Figure 10:
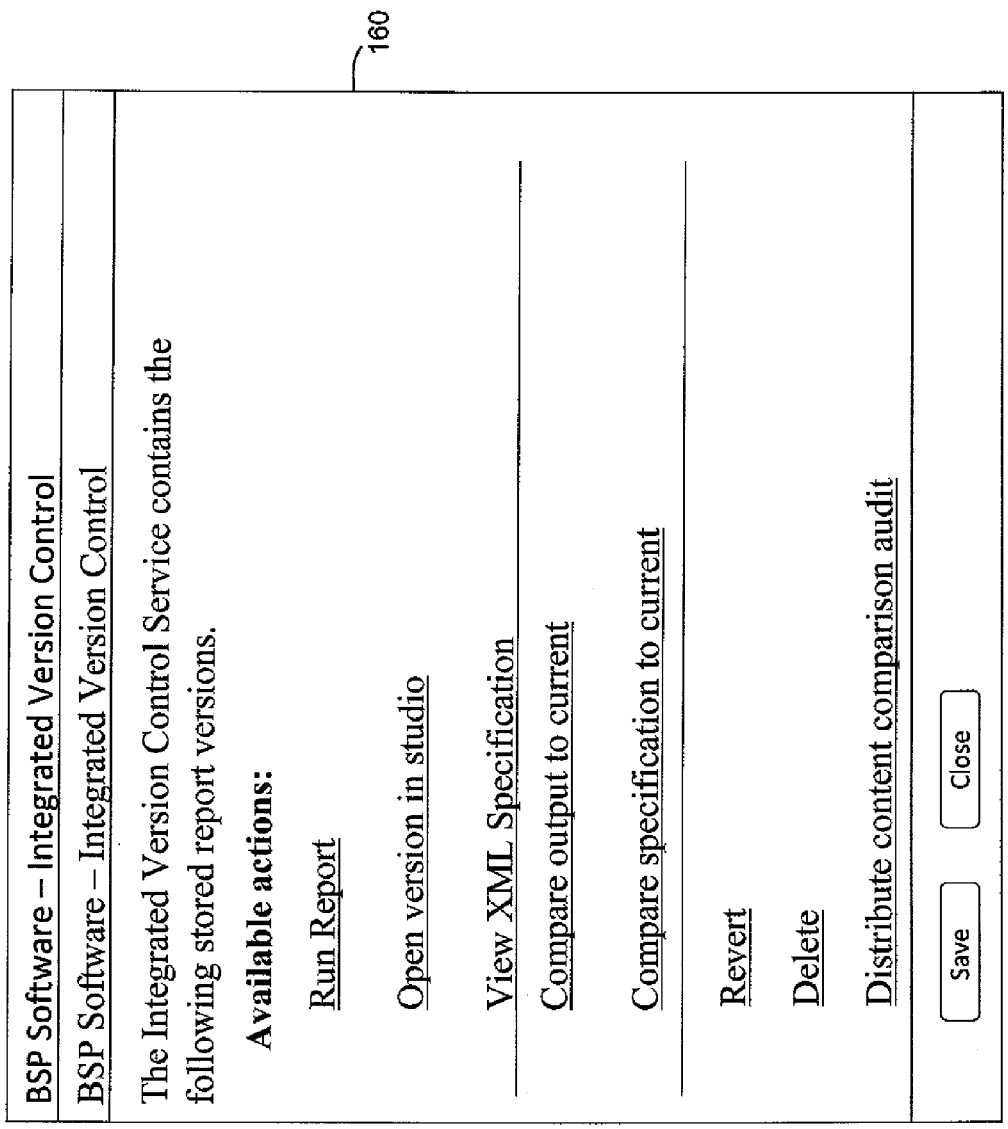
FIG. 10 is a simplified representation of an exemplary browser interface (i) generated by the software module arrangement and client-server framework depicted in FIG. 4, and (ii) configured to support further version control operations for managing the version history with respect to a version selected via the interface of FIG. 9.

FIG. 10 depicts another exemplary user interface display panel or window 160 that presents further operations or actions available for initiation with respect to selected objects. The window 160 may be generated via further instructions inserted, appended, or otherwise incorporated into the textual instructions defining the client environment, as described above, and may be accessed via selection of, for instance, a link to more available actions (e.g., "More . . . ") provided in the tables 153 (FIG. 9A) and 154 (FIG. 9B). In this example, available actions include running the selected version of the report by executing the object definition from the version control repository to the business intelligence system, opening the version in Report Studio (or other studio in which the object was originally authored) by passing the object definition from the version control repository to the applicable studio, viewing the object definition of the version (in this case, an XML specification) within the browser from the version control repository, generating a visual, side-by-side output comparison of the results of executing the object definition within the version control repository and the object definition for the associated object within the business intelligence system (e.g., selected vs. current), generating an object definition comparison (e.g., selected vs. current), reversion (e.g., replacing the applicable object definition stored within the content store with the applicable object definition from the version control repository), deletion of the applicable object definition from the version control repository, and distribution of the output comparison of the results (both in output and object definition) along with an audit trail highlighting variances between them. This distribution content comparison audit option may be configured to provide a detailed record keeping of the variations between any two object definitions both visually and programmatically, and can be sent to any user within or outside the business intelligence system. Examples of the user interface display panels, windows, or elements generated via implementation of these actions are provided in FIGS. 11 (definition viewing), 12 (definition comparison), and 13 (output comparison). Notwithstanding the example shown in FIG. 10 and the foregoing description, the features and operations of the disclosed version control methods and systems involving two versions may also be applied to two past versions (as opposed to a past version and the current version).

Figure 11:
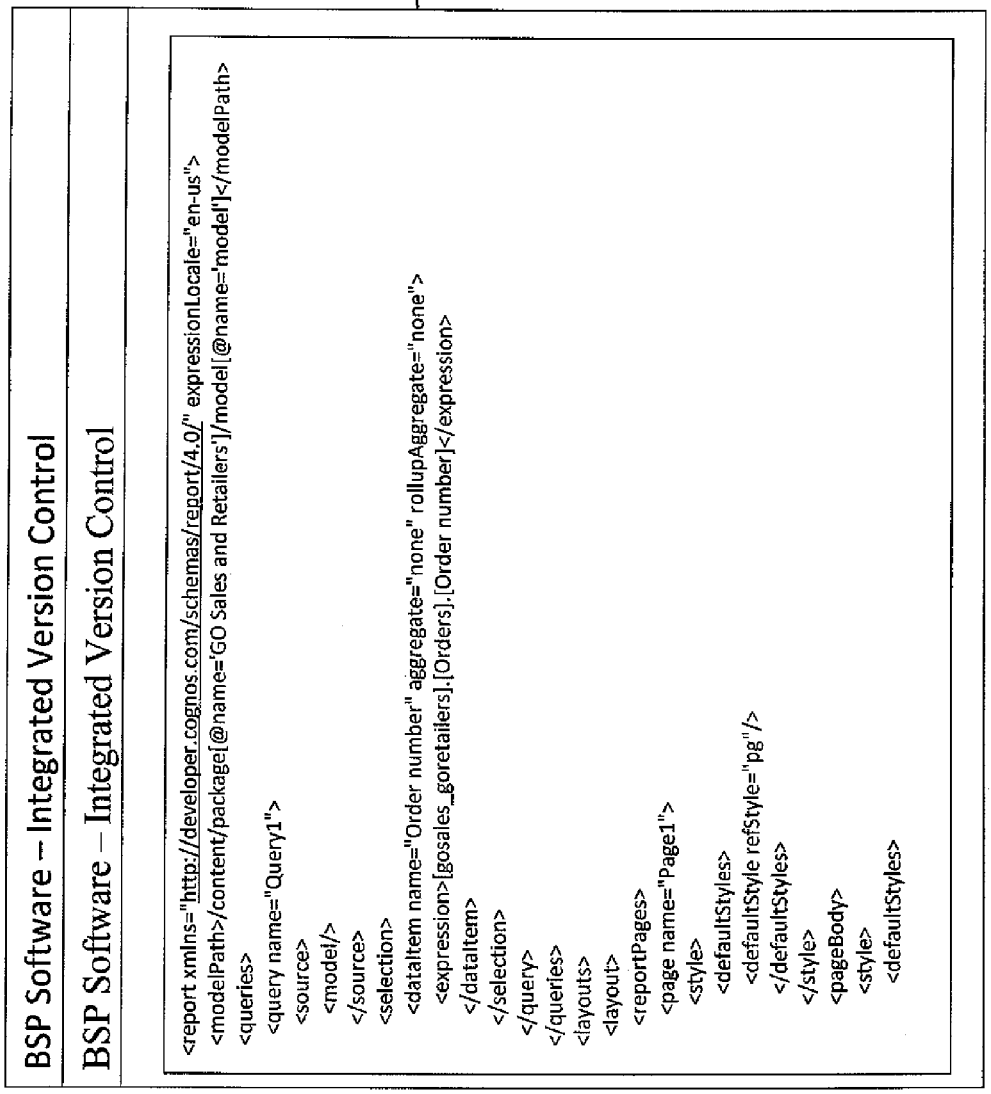
FIG. 11 is a simplified representation of an exemplary browser interface (i) generated by the software module arrangement and client-server framework depicted in FIG. 4, and (ii) configured to present an object definition of a version selected via the interface of FIG. 9.

As described above, the object definitions subject to version control may, but need not, be set forth in a textual language, such as XML. Practice of the disclosed version control systems and methods is not limited to any specific object definition language, format, or arrangement. Nonetheless, XML-defined objects provide a convenient way to define what will eventually become further elements of the client environment via a browser interface. FIG. 11 provides an example of a user interface display 170 rendered by instructions configured to display the object definition in the form of an XML specification of a version of an object accessed from the version control repository. The definition may be stored as an object in a database table of the version control repository. FIG. 12 provides an example of a user interface display 180 directed to comparing the historical version of the object definition shown in FIG. 11 with the current version of the object definition stored in the content store. To that end, the display 180 may be rendered by instructions configured to (1) access the historical version from the version control repository, (2) access the current version from the content store, and (3) present the XML text of the two versions in a comparison arrangement. In this case, a modification to line 10 of the specification is identified via two separate lines of text indicating the content of the historical and current versions of the object definition.

Figure 13:
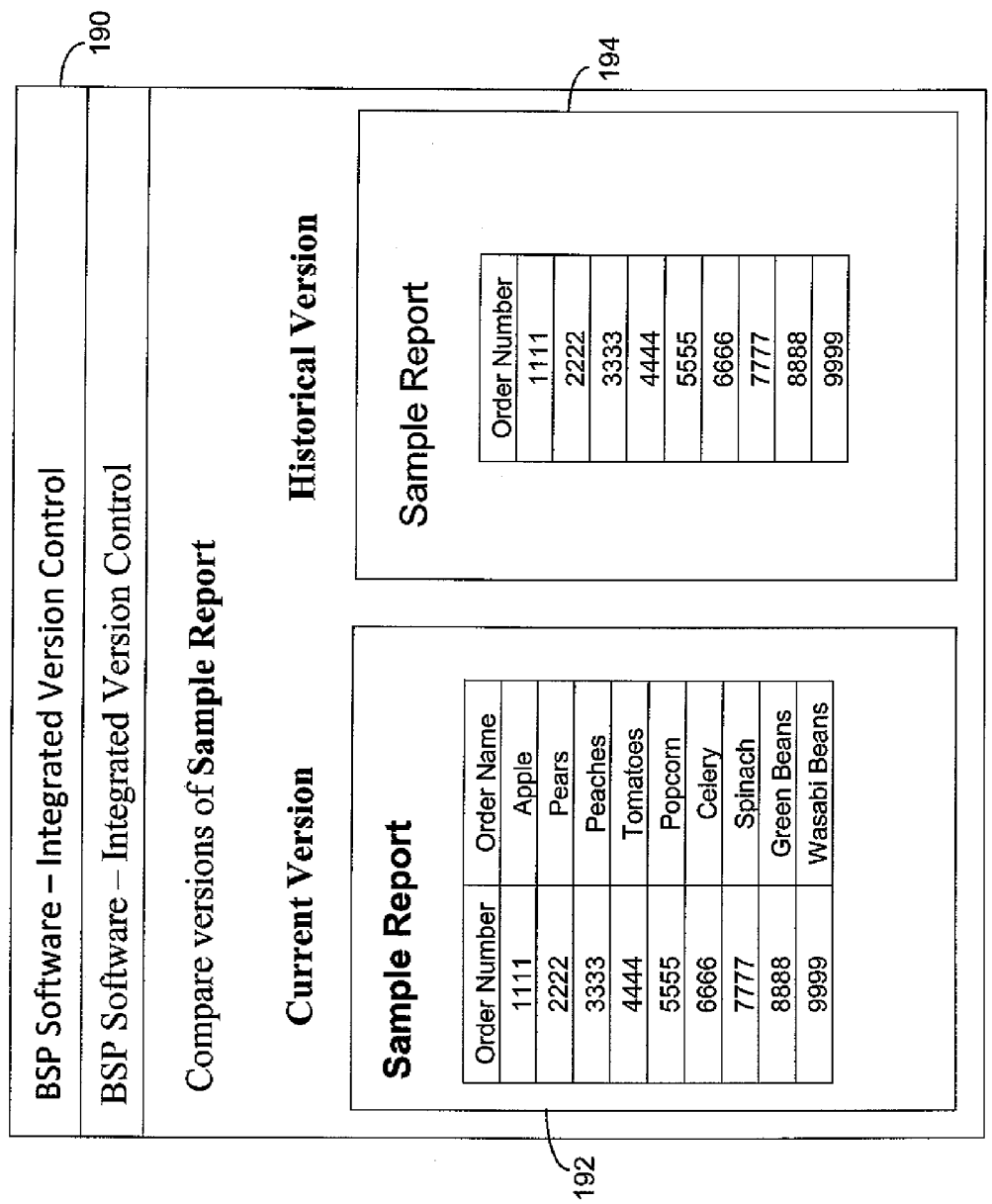
FIG. 13 is a simplified representation of an exemplary browser interface (i) generated by the software module arrangement and client-server framework depicted in FIG. 4, and (ii) configured to present a comparative rendering of the current and historical object definitions selected via the interface of FIG. 9.

FIG. 13 provides an example of a user interface display 190 rendered as a result of the execution of the output comparison option. In this example, instructions are configured to access the object definitions of two versions of an object (e.g., a report), run them through the rendering engine of the business intelligence system to generate the outputs, and then present the outputs in side-by-side panes 192, 194. In this example, execution of the object definition of a current report provides or results in the output shown in the pane 192, while execution of the object definition of the historical version of the report provides or results in the output shown in the pane 194. To produce the outputs, the current version of the object definition is obtained from the content store of the business intelligence system, while the historical version of the object definition is obtained from the version control repository of the version control system.

Figure 14:
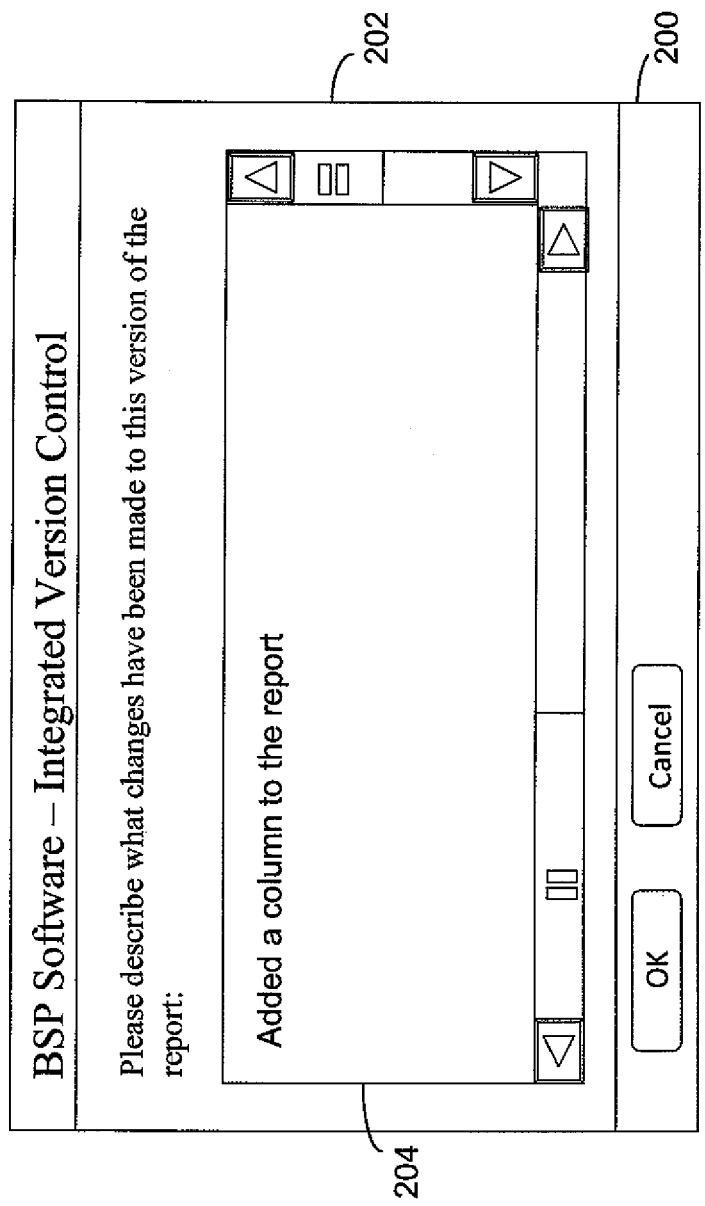
FIG. 14 is a simplified representation of an exemplary browser interface (i) generated by the software module arrangement and client-server framework depicted in FIG. 4, and (ii) configured to present an opportunity to store a version note or comment in connection with an object storage operation or one of the previously stored versions of the object definition.

FIG. 14 provides an example of a user interface display 200 rendered as a result of the implementation of a "Save with comments" or other operation in which an object definition is stored in association with a user supplied or other note or comment. The display 200 includes a window or panel 202 having a text insertion box 204 for the entry of comments or notes to annotate the version of the object definition being saved. As described above, this aspect of the disclosed version control systems and methods provides an author with an opportunity to describe the nature of the modifications that preceded the save operation. The description is then saved in the version control repository as metadata information associated with the historical version. Another user interface display (not shown) may be directed to revealing these notes and comments for each of the historical versions of an object definition.

FIG. 15 provides one example of the manner in which each of the foregoing user interface display windows or elements may be integrated within an existing business intelligence environment. More specifically, FIG. 15 presents an excerpt of the textual instruction set implemented by the business intelligence service unit to generate the client-side interface displays via a browser. In this case, the excerpt is from a markup language file from the business intelligence system, toolbars.xml, that utilizes XML to define a toolbar of the user interface display of one of the IBM Cognos studios described above. The excerpt shows how the toolbar is extended to include a version history viewing button or icon, as well as a modified save operation (as described above). Portions of the excerpt are bracketed or boxed to show how a "toolbarButton id" definition 210 of the original instruction set is removed or commented out, and replaced with two toolbarButton id definitions 212. The definitions 212 include function calls (e.g., displayversion.htm) and other external file references (e.g., revisions.gif) used to incorporate further instructions, data, or content in the rendering of the user interface display elements. These function calls might reference instructions set forth in another markup language (e.g., HTML, XML, etc.), a scripting language (e.g., Javascript), or any combination thereof.

FIG. 16 shows an example of an instruction set called by the definitions in the instruction set of FIG. 15. This example sets forth the instructions to be implemented in a version control storage operation in which the current version of the object definition is stored in the version control repository. In other examples, the instructions may not be set forth in HTML as shown or as a separate file (e.g., submitversion.htm). Nonetheless, the HTML file (or the textual instructions thereof or called thereby) may be accessed and stored as part of the version control service unit described above. Implementation of the instructions in this file may also, for instance, cause the user interface display 200 (FIG. 14) to be generated or rendered, in addition to defining the underlying storage operation functionality involving the object definition and the version control repository.

The instruction sets of an existing installation of a business intelligence service unit may be modified in accordance with the process steps shown in FIG. 17. The process steps may be implemented during an installation procedure of the version control service unit, which may be facilitated via a number of user interface displays of an installation wizard program. The user interface displays of an exemplary installation wizard program are set forth in FIGS. 21A-21E. In alternative cases, the installation wizard may be bypassed or otherwise not used to any desired extent, in which case a manual installation or modification of the files configuring the version control service unit may be conducted.

In the example shown in FIG. 17, a number of browser configuration files stored on the web and/or application server (s) of the business intelligence system are accessed and modified to incorporate the changes shown, for instance, in FIG. 15. These changes may be made after the original configuration files are backed up, which may be useful in the event that the version control system needs to be uninstalled. Because the HTML and other markup language files defining the studio interfaces may vary between versions of the business intelligence system, the modifications may vary in accordance with the system version. The installation process of FIG. 17 also includes the storage of the version control configuration files of the version control service unit. These files may include, for instance, the HTML and other instructions sets for the version control functions, such as the function definition shown in FIG. 16.

Figure 18B:
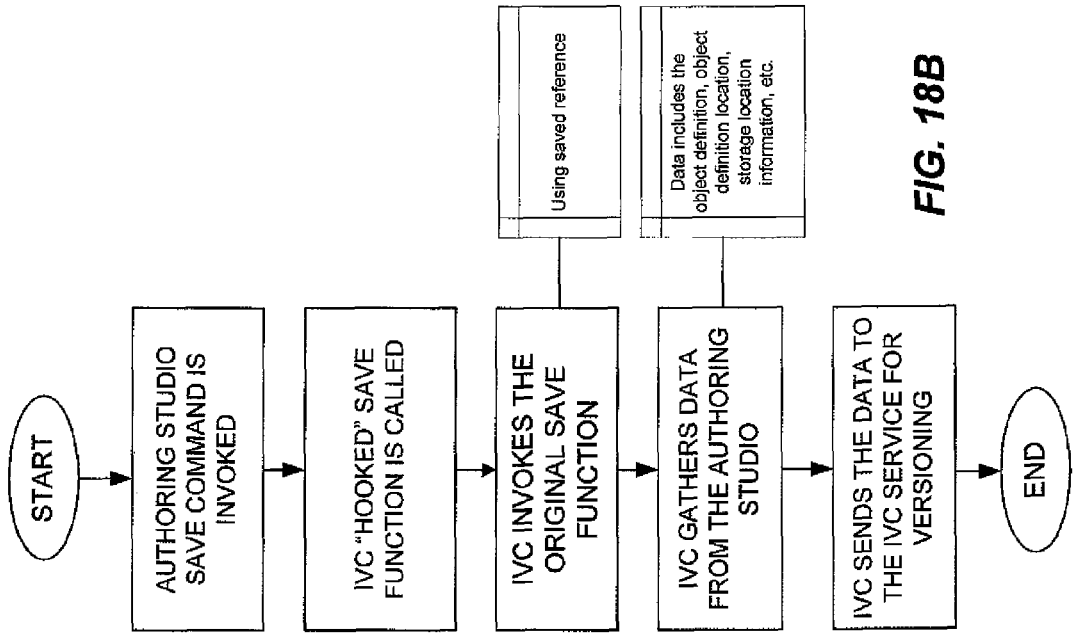
FIGS. 18A and 18B are flow diagrams of exemplary run-time processes implementing one or more instruction sets installed or modified in the process flow of FIG. 17 for automated, run-time modification of an existing installation of a business intelligence application to incorporate version control features in accordance with one embodiment of the disclosure.
Figure 18A:
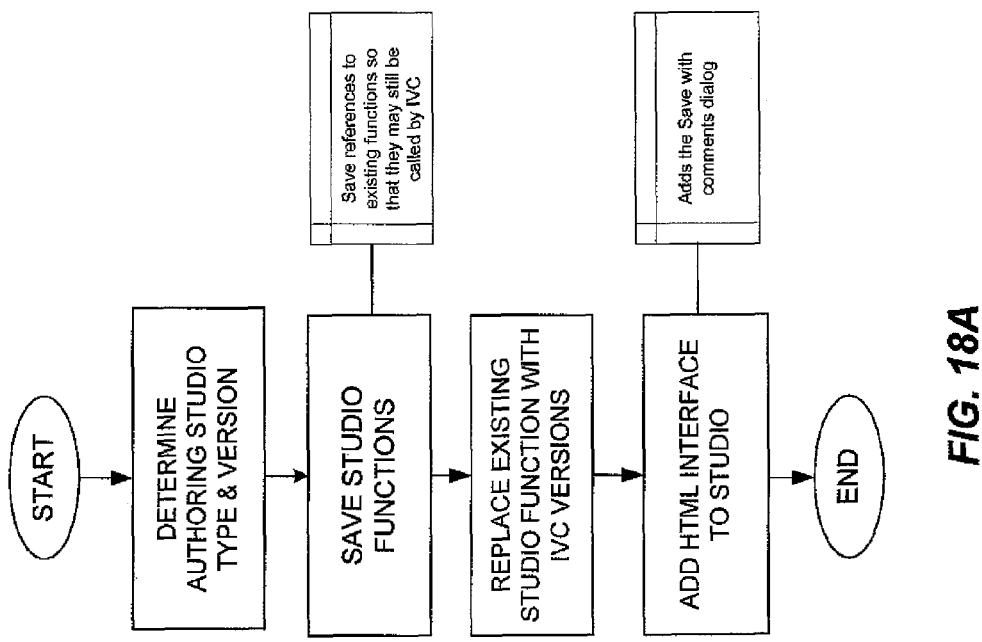

FIGS. 18A and 18B depict one approach to modifying an existing installation of the business intelligence system to integrate the disclosed version control functionality. This approach does not attempt to change the browser configuration files of the business intelligence system in the manner shown in FIG. 15. More specifically, this approach avoids having to locate, remove (e.g., comment out), and replace the instruction set for a studio save operation. In contrast to alternative approaches involving modification of the instructions to call a different save function or change the file(s) defining the save function, this approach allows those files to be accessed and loaded into the memory of the business intelligence server as it prepares to instruct the client browser. Instead of those multiple, relatively complex changes, the installation of the version control system in accordance with this approach involves only an addition of a short set of instructions inserted at or near, or appended to, the end of the HTML (or other) instruction set that includes those function calls. In this approach, the execution of the short set of instructions redefines the save operation of the studio interface as described below. In this way, the modifications to the existing business intelligence system are implemented at run-time (e.g., when the studio is called from and launched within the client browser and the rendering instructions are sent from the business intelligence service unit to the client browser).

Examples of the added set of instructions are shown in the HTML file excerpts shown in FIGS. 19A (Report Studio) and 19B (Analysis Studio). In this example, the textual instruction files shown in FIGS. 19A and 19B are HTML files, rsapp.htm (Report Studio) & explore.htm (Analysis Studio), generally containing the HTML markup for displaying the studio, the JavaScript or references to JavaScript file to support the studio's functionality, and any other textual data, including for example CSS style information and XML data. Because the modifications to the Report and Analysis Studios are similar, the added instructions include similar lines of HTML code that instruct the web page to download and execute the same referenced JavaScript file (app_Common.js). This file is generally configured to automatically discover which studio interface and IBM Cognos version is hosting the JavaScript file and the instruction set will take appropriate action to install or incorporate the version control functionality. As described above, this functionality includes redirecting the save command or operation as well as adding new buttons to the toolbar and menu interfaces. This instruction file may also make use of other data within the browser session, such as the URL location of the browser session, any cookies of the session, and other JavaScript functions and variables loaded by the studio.

FIG. 18A shows how the operation of the "Save" command is modified by version control instructions loaded as a result of the additional instructions shown in FIGS. 19A and 19B, during a launch of the specific business intelligence studio interface. In other words, the flow diagram of FIG. 18A describes how the "Save" command is hooked when the script function, app_Common.js (FIGS. 19A, 19B) is called and loaded. FIG. 18B shows the steps implemented during an implementation of the "Save" command operation as modified by the loaded version control instructions. In this way, selection and implementation of the "Save" command operation causes the version control functionality to be implemented in addition to the normal storage operation involving the content store.

In the modification technique shown in FIGS. 18A and 18B, the installation of the version control system does not modify the textual (e.g., XML) instructions of the specification for the Save command or add a new button (e.g., View version history). Instead, the textual instructions are modified in the memory of the web/application server of the business intelligence system at run-time as the instructions are being generated and downloaded to the client browser. The process flow shown in FIG. 18A shows one example of this run-time modification in accordance with the above-identified script function. Each of the steps shown in FIG. 18A are encountered and implemented by the business intelligence server at the end of the HTML files defining the studios (e.g., rsapp.htm and explore.htm). Because they are implemented last, the instructions override any previous instructions defining the user interface for the browser. To that end, the instructions first determine the studio type and version to be modified, then rename the previously defined studio save function by, for instance, storing the function under a new name (e.g., save.old). The instructions then replace the studio function in the memory of the business intelligence service unit with the version control save function so that calls to the studio function instead call the version control function. For example, if the studio save function was called "save", then this replacement may be accomplished by re-defining the function called "save" in accordance with the version control save function. The definition of the version control save function, in turn, will include a function call to the renamed studio function (e.g., save.old) so that implementation of the save operation still causes the object definition to be stored in the content store. The balance of the version control save function may then be directed to storing the object definition as another version in the version control repository. These steps are shown in the exemplary process flow of FIG. 18B, which depicts the operations taken once the save command is selected.

Exemplary modifications to the browser configuration files for Query Studio are shown in FIGS. 20A and 20B. In this example, XML function calls are added to a pair of XML files used to generate the studio interface, namely ui.xml (FIG. 20A) and features.xml (FIG. 20B). Because this studio (and other interfaces) may generate HTML instructions for the client browser on the fly, the above-described function calls to Javascript or other textual instructions directed to integrating the version control functionality may be inserted into other XML or other configuration files (i.e., other than those shown) that are called as part of the launch of the studio.

As shown by the foregoing examples, the modifications of the textual instructions of the existing business intelligence system installation may occur at a variety of levels and at different operational orders. In some cases, the integration of the version control system may involve incorporating references to, and installation of, entirely different sets of textual instructions. Alternatively or additionally, the function calls and other references to the sets of textual instructions may still refer to the same files and functions of the business intelligence installation, albeit with changes incorporated therein. The modifications described in connection with the examples of FIGS. 18A and 18B may alternatively or additionally be used to allow the sets of textual instructions to remain unmodified with the exception of an addition of a function call or reference to the textual instructions directed to overriding the instructions and definitions of the business intelligence system as they are loaded in the server memory before being passed to the client browser.

Examples of the user interface displays generated by the installation wizard program are set forth in FIGS. 21A-21E.

Figure 21A:
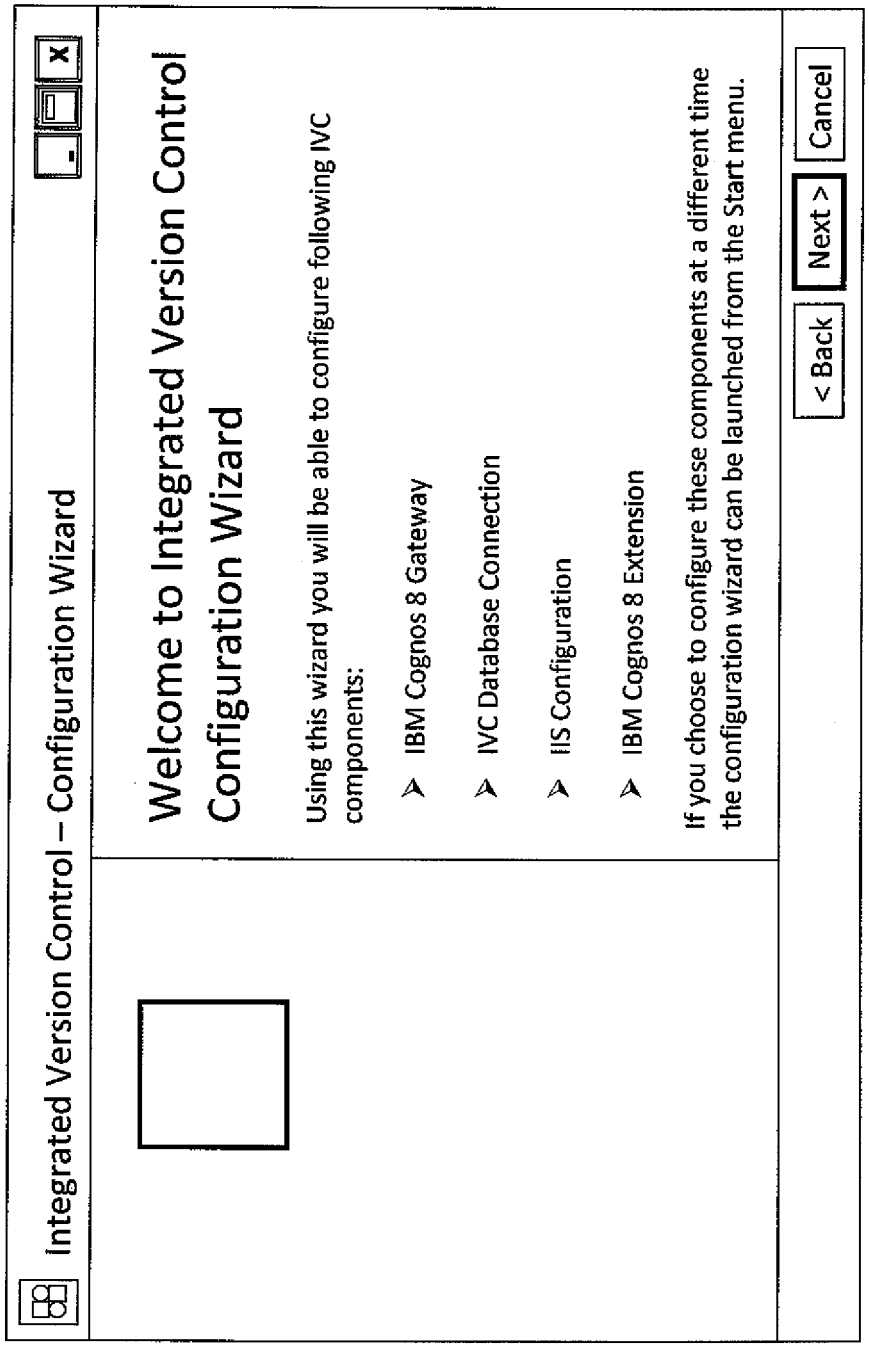
Figure 21B:
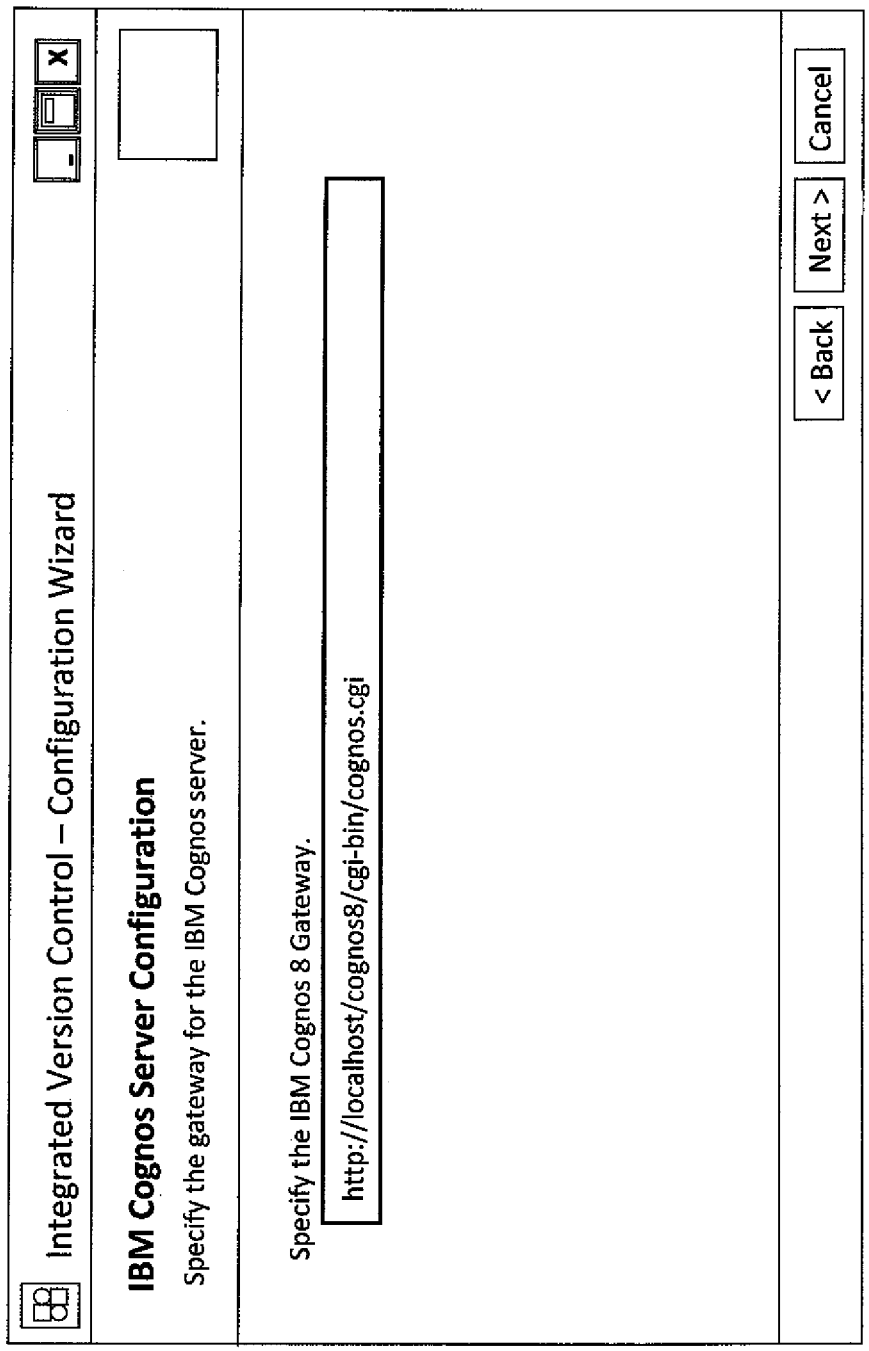
Figure 21C:
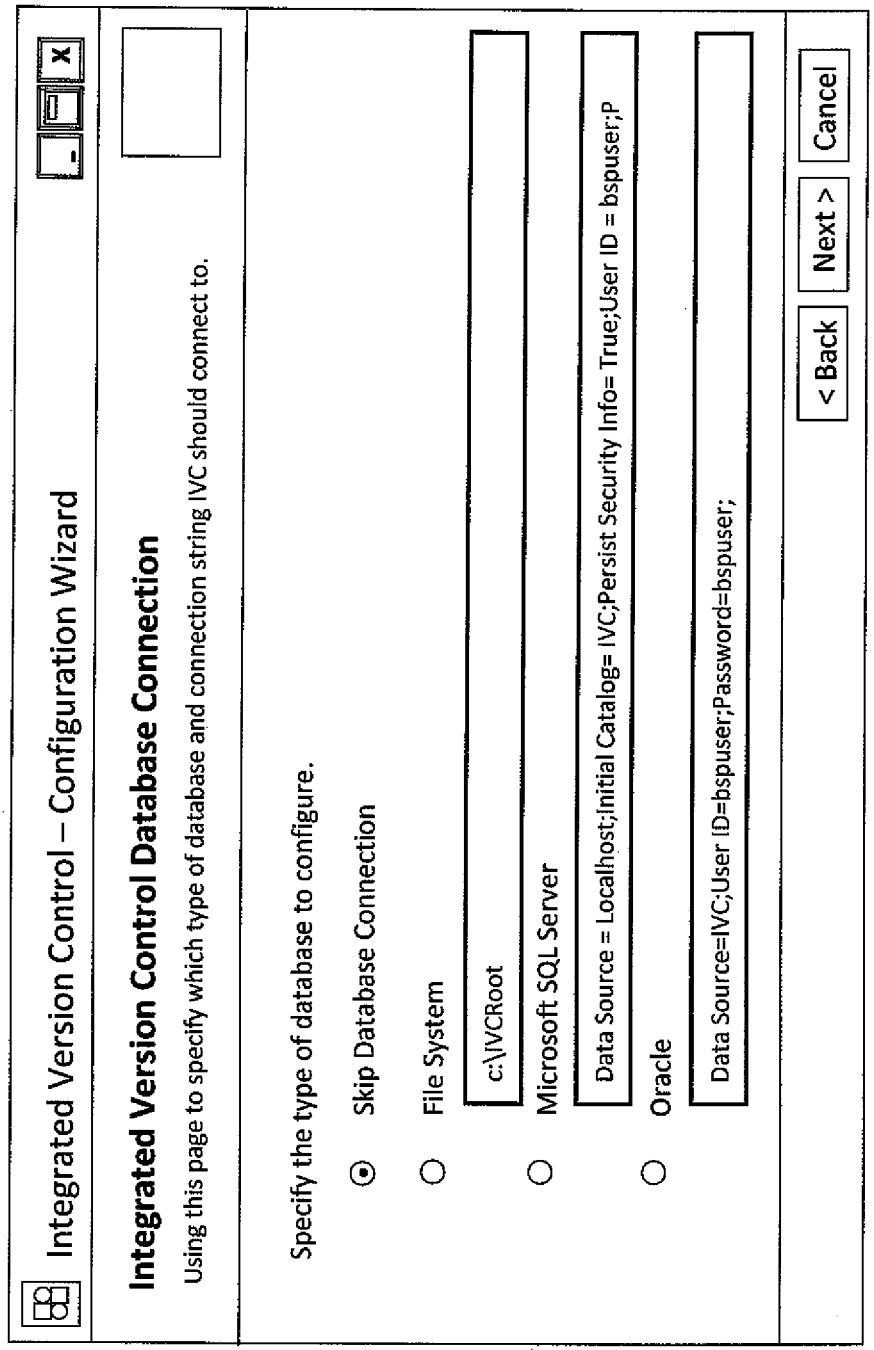
Figure 21D:
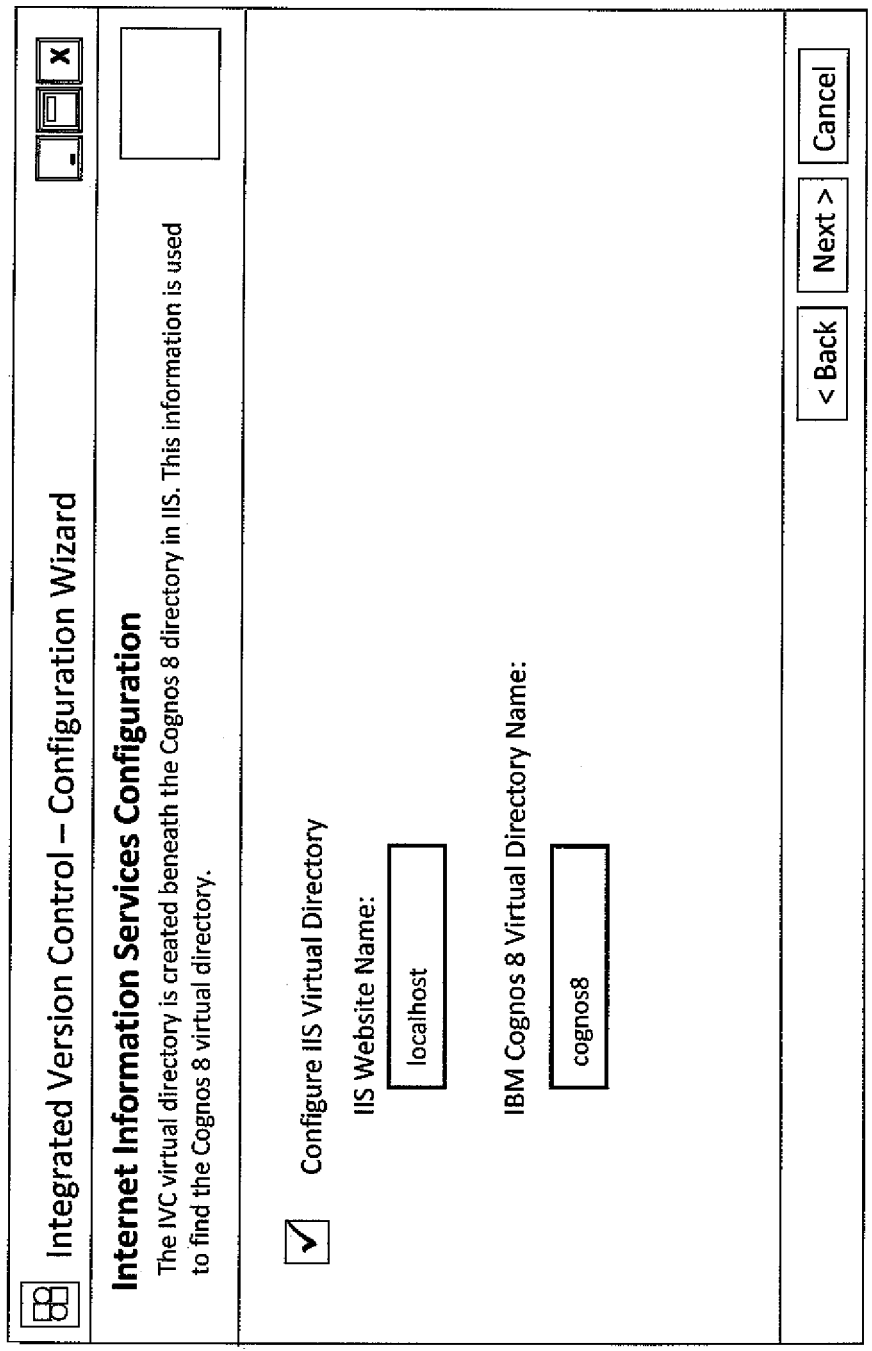
Figure 21E:
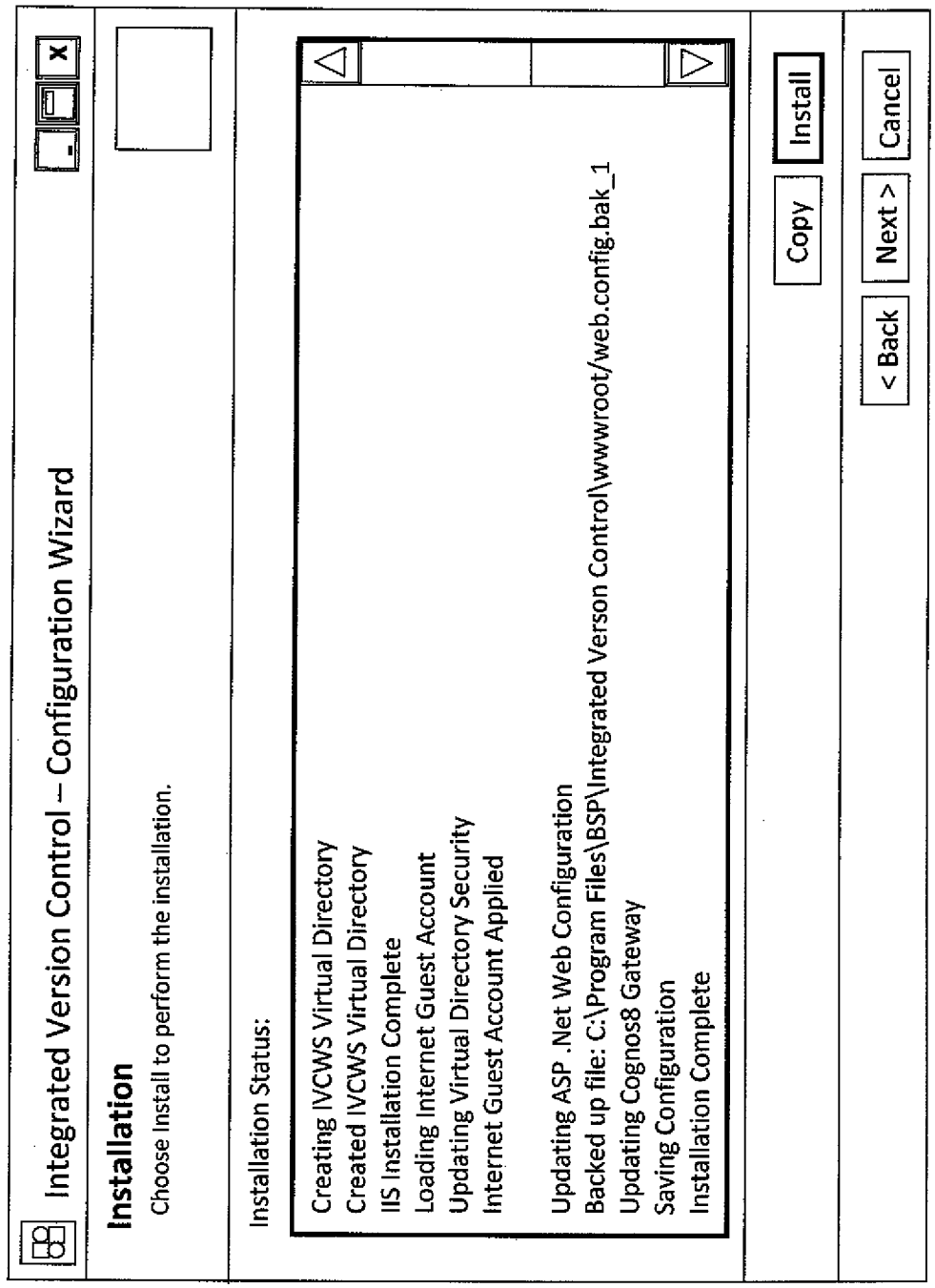

The installation wizard and procedure for the disclosed version control systems and methods are more generally configured to obtain information regarding the existing installation of the business intelligence service. For example, the location of the IBM Cognos gateway may be identified via a path (FIG. 21B), the version control repository may be identified by type, location, and other indicia (FIG. 21C), and the location of the web server instruction sets may be identified by directory name (FIG. 21D). This information is then used to automate the installation of the version control service, including the modification of the instruction sets of the business intelligence service for integration therewith.

One advantageous result of the real-time nature of the solution provided by the above-described version control systems and methods involves the ability to review a version history populated and enhanced with information explaining the differences or modifications between successive or selected versions. Rather than saving each version with a different name that attempts to provide such information on a very limited basis, the disclosed systems and methods enable an author to store information (e.g., metadata) to be associated with the version being saved. Furthermore, user interface display elements made available from within the user interface displays of the business intelligence environment provide opportunities for side-by-side and other comparisons. As a result, a separate application need not be accessed and run, even though an external version control repository is accessed (instead of the content store) to obtain the historical versions and other history information. Moreover, the disclosed systems and methods provide a real-time solution with user interfaces integrated within the business intelligence environment despite supporting storage of, or access to, the version information outside of the business intelligence system.

Embodiments of the disclosed system and method may be implemented in hardware or software, or a combination of both. Some embodiments may be implemented as computer programs executing on programmable systems having at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, practice of the disclosed system and method is not limited to any particular programming language. In any case, the language may be a compiled or interpreted language.

The programs may be stored on a storage media or device (e.g., floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the disclosed system and method may also be considered to be implemented as a machine-readable storage medium, configured for use with a processing system, where the storage medium so configured causes the processing system to operate in a specific and predefined manner to perform the functions described herein.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding only, and no unnecessary limitations should be understood therefrom, as modifications within the scope of the invention may be apparent to those having ordinary skill in the art.

What is claimed is:

1. A version control system for a business intelligence network comprising a business intelligence server and a metadata repository in communication with the business intelligence server for storage of metadata indicative of a definition of an object of a business intelligence environment developed via a browser of a client directed by the business intelligence server, the version control system comprising:
   a server computer comprising a version control server configured for network communication with the business intelligence server and the client; and
   a version control repository in communication with the version control server and configured for storage of multiple versions of the object definition;
   wherein the business intelligence server is configured with a first textual instruction set to direct the browser to create an interface of the business intelligence environment, the interface comprising a save operation to store a current version of the object definition in the metadata repository, and
   wherein the browser is further directed by the version control server with a second textual instruction set called by the first textual instruction set and configured to integrate into the interface a version control operation directed to managing one or more of the multiple versions of the object definition, the second textual instruction set directing the browser to incorporate an interface element into the interface, the interface element being selectable by a user to initiate implementation of the version control operation by the version control server.

2. The version control system of claim 1, wherein the version control operation is a version history viewing operation.

3. The version control system of claim 1, wherein the version control operation is a version comparison operation.

4. The version control system of claim 1, wherein the version control operation is a save-with-comments operation.

5. The version control system of claim 1, wherein the version control operation is a reversion operation configured to replace the current version of the object definition in the metadata repository with a selected one of the multiple versions of the object definition.

6. The version control system of claim 1, wherein the object definition defines a report of the business intelligence environment.

7. The version control system of claim 1, wherein the object definition defines a job or an event sequence of the business intelligence environment.

8. The version control system of claim 1, wherein the first textual instruction set comprises one or both of markup language instructions or scripting language instructions.

9. The version control system of claim 1, wherein the second textual instruction set comprises one or both of markup language instructions or scripting language instructions.

10. The version control system of claim 1, wherein the first textual instruction set includes a definition of the save operation and a function call to the second textual instruction set that follows the definition of the save operation such that loading the second textual instruction set renames and replaces the definition of the save operation at run-time before the browser is directed to create the interface.

11. The version control system of claim 1, wherein the business intelligence server includes a web server configured to support communications between the browser, the business intelligence server, and the version control server, the communications including instructions to the browser from the version control server in accordance with the second textual instruction set.

12. The version control system of claim 1, wherein the business intelligence server includes a web server configured to pass instructions from the business intelligence server to the browser, the instructions including the first textual instruction set and a modification embedded in the first textual instruction set, the embedded modification including a reference to the second textual instruction set.

13. The version control system of claim 12, wherein the embedded modification is configured to incorporate the interface element into the interface via a Javascript extension.

14. A method of version control in a business intelligence network comprising a business intelligence server and a metadata repository in communication with the business intelligence server and configured for storage of a current version of a definition of an object of a business intelligence environment developed via a browser of a client directed by the business intelligence server, the method comprising:
  directing the browser to create an interface of the business intelligence environment in accordance with a first textual instruction set on the business intelligence server, the interface comprising a save operation to store the current version of the object definition in the metadata repository; and
  integrating into the interface a version control operation directed to managing one or more of multiple versions of the object definition by directing the browser with a second textual instruction set on a version control server, the second textual instruction set being called by the first textual instruction set to incorporate an interface element into the interface, the interface element being selectable by a user to initiate implementation of the version control operation by the version control server.

15. The method of claim 14, wherein the version control operation is a version history viewing operation.

16. The method of claim 14, wherein the version control operation is a version comparison operation.

17. The method of claim 14, wherein the version control operation is a save-with-comments operation.

18. The method of claim 14, wherein the version control operation is a reversion operation configured to replace the current version of the object definition in the metadata repository with a selected one of multiple versions of the object definition.

19. The method of claim 14, wherein the object definition defines a report of the business intelligence environment.

20. The method of claim 14, wherein the object definition defines a job or an event sequence of the business intelligence environment.

21. The method of claim 14, wherein the first textual instruction set comprises one or both of markup language instructions or scripting language instructions.

22. The method of claim 14, wherein the second textual instruction set comprises one or both of markup language instructions or scripting language instructions.

23. The method of claim 14, wherein the directing step comprises the steps of:
  loading a definition of the save operation in accordance with the first textual instruction set; and
  implementing a function call to the second textual instruction set after the loading step such that the definition is renamed and replaced at run-time.

24. The method of claim 14, wherein integrating the version control operation comprises passing instructions to the browser via a web server of the business intelligence server, the instructions comprising the second textual instruction set.

25. The method of claim 14, wherein:
  directing the browser comprises passing instructions to the browser via a web server of the business intelligence server, the instructions comprising the first textual instruction set; and
  integrating the version control operation comprises embedding a modification into the instructions, the embedded modification including a reference to the second textual instruction set.

26. The method of claim 25, wherein the embedded modification is configured to incorporate the interface element into the interface via a Javascript extension.

27. A method of configuring a business intelligence network comprising a business intelligence server and a metadata repository in communication with the business intelligence server configured for storage of a current version of a definition of an object of a business intelligence environment developed via a browser of a client directed by the business intelligence server, the method comprising:
  modifying a first textual instruction set on the business intelligence server, the first textual instruction set directing the browser to create an interface of the business intelligence environment, the interface comprising a save operation to store the current version of the object definition in the metadata repository, the modifying step comprising the step of incorporating a version control function call into the first textual instruction set; and
  installing a second textual instruction set on a version control server in communication with the business intelligence network, the second textual instruction set being referenced in the version control function call and configured to integrate into the interface a version control operation directed to managing one or more of multiple versions of the object definition, the second textual instruction set directing the browser to incorporate an interface element into the interface, the interface element being selectable by a user to initiate implementation of the version control operation by the version control server.

28. The method of claim 27, wherein the version control operation is a version history viewing operation.

29. The method of claim 27, wherein the version control operation is a version comparison operation.

30. The method of claim 27, wherein the version control operation is a save-with-comments operation.

31. The method of claim 27, wherein the version control operation is a reversion operation configured to replace the current version of the object definition in the metadata repository with a selected one of multiple versions of the object definition.

32. The method of claim 27, wherein the first textual instruction set comprises one or both of markup language instructions or scripting language instructions.

33. The method of claim 27, wherein the second textual instruction set comprises one or both of markup language instructions or scripting language instructions.

34. The method of claim 27, wherein the modifying step comprises the step of inserting the version control function call in the first textual instruction set after a definition of the save operation such that the second textual instruction set renames and replaces the definition of the save operation.

* * * * *